(12) United States Patent
Shioda et al.

(10) Patent No.: US 8,841,356 B2
(45) Date of Patent: Sep. 23, 2014

(54) INK COMPOSITION

(75) Inventors: Satoshi Shioda, Tokyo-to (JP); Tatsuro Ishitobi, Tokyo-to (JP); Takao Otomaru, Tokyo-to (JP); Rumiko Matsuo, Tokyo-to (JP); Eiichi Miyata, Tokyo-to (JP); Ataru Miyata, legal representative, Niigataken (JP); Masaki Inumaru, Tokyo-to (JP); Yukio Sugita, Tokyo-to (JP); Fumie Yamazaki, Tokyo-to (JP); Naoki Shiraishi, Tokyo-to (JP); Mitsuyoshi Tamura, Tokyo-to (JP)

(73) Assignee: DNP Fine Chemicals Co., Ltd., Yokohama-shi, Kanagawa (JP)

( * ) Notice: Subject to any disclaimer, the term of this patent is extended or adjusted under 35 U.S.C. 154(b) by 55 days.

(21) Appl. No.: 13/499,106

(22) PCT Filed: Sep. 30, 2010

(86) PCT No.: PCT/JP2010/067066
§ 371 (c)(1),
(2), (4) Date: Aug. 7, 2012

(87) PCT Pub. No.: WO2011/040517
PCT Pub. Date: Apr. 7, 2011

(65) Prior Publication Data
US 2012/0308786 A1 Dec. 6, 2012

(30) Foreign Application Priority Data

Sep. 30, 2009 (JP) ................................ 2009-228816
Mar. 26, 2010 (JP) ................................ 2010-071556

(51) Int. Cl.
C09D 11/10 (2014.01)
C08L 43/02 (2006.01)
C09D 11/324 (2014.01)
C09C 1/56 (2006.01)
C09D 11/322 (2014.01)

(52) U.S. Cl.
CPC ........... C09D 11/322 (2013.01); *C01P 2004/64* (2013.01); *C09D 11/324* (2013.01); *C01P 2004/62* (2013.01); *C09C 1/56* (2013.01)
USPC ............ 523/160; 524/376; 524/386; 524/710

(58) Field of Classification Search
USPC .......................................... 523/160; 524/710
See application file for complete search history.

(56) References Cited

U.S. PATENT DOCUMENTS

2001/0035110 A1* 11/2001 Kato ............................ 106/31.6
2004/0157958 A1* 8/2004 Vincent et al. ................ 523/160

(Continued)

FOREIGN PATENT DOCUMENTS

JP 2006-520405 A 9/2006
JP 2008-285605 A 11/2008

(Continued)

OTHER PUBLICATIONS

International Search Report; mailed Jan. 11, 2011; PCT/JP2010/067066.

*Primary Examiner* — Vu A Nguyen
(74) *Attorney, Agent, or Firm* — Ladas & Parry LLP

(57) ABSTRACT

Disclosed is an ink composition which has superior storage stability, is resistant to bleeding, has good fixability to paper, and enables printing of a clear image. The ink composition includes a pigment dispersion containing a surface-treated pigment and a resin emulsion, wherein the surface-treated pigment is obtained by binding a functional group, having a larger calcium index than a calcium index of 1,2,3-benzenetricarboxylic acid, to the surface of a pigment; and the resin emulsion is adapted so that an aqueous solution containing 1 mass % of a solid content of the resin emulsion has a conductance of 300 μS/cm or less.

16 Claims, 2 Drawing Sheets

(56) References Cited

U.S. PATENT DOCUMENTS

| | | | |
|---|---|---|---|
| 2005/0215664 A1* | 9/2005 | Elwakil et al. | 523/160 |
| 2007/0100023 A1* | 5/2007 | Burns et al. | 523/160 |
| 2008/0264298 A1* | 10/2008 | Burns | 106/31.86 |
| 2008/0282932 A1* | 11/2008 | Kiyomoto et al. | 106/31.65 |

FOREIGN PATENT DOCUMENTS

| | | |
|---|---|---|
| JP | 2008-303380 A | 12/2008 |
| JP | 2009-513802 A | 4/2009 |
| JP | 2009-515007 A | 4/2009 |
| WO | 01/79362 A1 | 10/2001 |
| WO | 2008/025949 A1 | 3/2008 |

* cited by examiner

INK COMPOSITION

TECHNICAL FIELD

The present invention relates to an ink composition which has superior storage stability, is resistant to bleeding, and has good fixability to paper, and enables printing of a clear image.

BACKGROUND ART

Paper is hydrophilic material and by nature, tends to have an affinity to water because many hydroxyl groups of cellulose exist therein, so that it absorbs water to swell. For this, a hydrophobic material (mainly, a neutral sizing agent) preventing bleeding is added during the course of producing paper for the purpose of providing water resistance to a printing paper. Also, a white inorganic pigment (for example, clay and calcium carbonate) is added to printing papers to provide whiteness and transparency. Because the grain size of the pigment is smaller than the irregularities of fibers, surface roughness formed by fibers remains on the surface of the paper and therefore, printing accuracy is limited if the paper is used as it is for printing. The surface of the paper is coated with a pigment having a grain size of about 0.1 to 0.3 μm and primarily containing kaolin and calcium carbonate to smooth it. However, a binder such as a synthetic latex used to fix this pigment fills clearances between the pigment grains to hydrophobicize the surface. The surface of the coated paper is smoothed to be hydrophobic in this manner. Heavy calcium carbonate (one obtained by milling and classifying natural lime stone) is usually used for coated paper such as art paper, coat paper, gravure paper and internally sized paper such as high-quality paper, middle-quality paper, and rice paper. Many uncoated papers and coated paperbase contain calcium salts such as calcium carbonate and almost all coat layers of coated papers also contain calcium salts such as calcium carbonate.

Ink jet printing systems have been developed and widely put into practical use in paper printing fields.

When an inkjet printer is used to print, ink droplets discharged from a print head are landed on a printing paper, penetrated and fixed to form dots, with a lot of these gathering dots, an image is formed. This process of formation of dots is important to form a clear image.

When a concept "bleed rate" which is a value showing how many times the diameter of a dot becomes as that of a discharged ink droplets is used, the bleed rate b is given by $b=D/d$ when the diameter of the discharged ink droplet is d and the diameter of a dot on the printing paper is D.

Because it may be considered that the formation of dots on printing paper is divided into a landing phenomenon and a penetration phenomenon, the following equation can be described: $b=(D/D')\times(D'/d)$, using the diameter D' of a dot when a droplet is landed on the printing paper.

Here, when landed spread rate s and penetration spread rate p are defined as $s=D'/d$ and $p=D/D'$, the bleed rate b may be given by $b=s\times p$ (see, The imaging Society of Japan, "Inkjet", Tokyo Denki University Press, September 10 in 2008). Therefore, in order to form a clear image, it is necessary to improve fixability by modifying a pigment, resin emulsion and the like in an ink composition to thereby prevent the penetration spread rate p from being increased.

Also, when an ink composition is penetrated into plain paper, such a phenomenon (feathering) occurs that the periphery of an image becomes fluffy, reflecting the mesh of cellulose fibers forming the plain paper. Because this phenomenon more or less occurs when ink penetrates into paper, it is necessary to limit the penetration by conditioning the composition of an ink to avoid feathering. If the penetration is limited on the other hand, this requires a certain time for the ink to be fixed, which is sometimes a hindrance to high-speed recording. In the design of ink, in order to attain the compatibility between feathering and fixing time, the ink needs to be fixed by adjusting the ink penetration.

Various papers such as coated paper and uncoated paper are used as the paper medium to be used as a printing paper. However, in the case of uncoated paper, a coloring material is not retained on the surface of the paper because ink is easily penetrated into paper fibers, posing the problem that paper bleeding is easily caused, so that only insufficient density is obtained. In the case of coated paper, on the other hand, ink is scarcely penetrated and a coloring material is scarcely fixed because a coat layer exists on the surface of the paper, the ink tends to bleed so that a clear image cannot be obtained.

In light of this, a denatured pigment obtained by binding a functional group, having a predetermined calcium index, to the surface of a pigment is proposed, to improve the fixability of the coloring material to paper (see, for example, Patent Literatures 1 and 2).

Here, the calcium index indicates a measure of ability to coordination-binding dissolved calcium ions, that is, ability of the functional group which captures the calcium ions. The larger the calcium index is, the more strongly and more effectively the functional group coordination-binds the calcium ions.

Also, many uncoated papers and coated papers contain calcium salts such as calcium carbonate and many coat layers of coated papers contain calcium salts such as calcium carbonate.

The above patent literatures describe such an inference that when an ink composition containing a denatured pigment as mentioned above is printed on paper, the denatured pigment interacts or binds with a calcium salt or other divalent metal salts existing in or on the surface of the paper, with the result that a coloring material is easily fixed to the paper.

CITATION LIST

Patent Literature

Patent Literature 1: Japanese PCT National Publication No. 2009-513802
Patent Literature 2: Japanese PCT National Publication No. 2009-515007

SUMMARY OF INVENTION

Technical Problem

However, it has been found that in the above ink composition, a denatured pigment having high reactivity with paper, specifically, high reactivity with a calcium salt or other divalent metal salts existing in or on the surface of paper tends to interact with metal ions other than divalent metal salts such as calcium salts and counter ions (for example, sodium ions and ammonium ions), giving rise to such a new problem that the coagulation and gelation of ink are caused when compounds containing other counter ions such as a resin emulsion are blended as a binder.

Problems concerning production and economy remains, if all of the pigments to be used in the above-mentioned ink composition, including inorganic pigments such as carbon black and organic pigments such as blue, brown, cyan, green, violet, magenta, red, orange, or yellow pigments, are surface-treated and used as denatured pigments. Moreover, only the use of denatured pigments is not enough to inhibit the bleeding of an image and therefore, a clear image cannot be obtained.

The present invention has been made in view of the above situation and it is a main object of the present invention to provide an ink composition which has superior storage stability, is resistant to bleeding, and has good fixability to paper, enables printing of a clear image.

Solution to Problem

In order to attain The above object, the present invention provides an ink composition comprising a pigment dispersion containing a surface-treated pigment and a resin emulsion, wherein the surface-treated pigment is obtained by binding a functional group, having a larger calcium index than a calcium index of 1,2,3-benzenetricarboxylic acid, to the surface of a pigment; and the resin emulsion is adapted so that an aqueous solution containing 1 mass % of a solid content of the resin emulsion has a conductance of 300 μS/cm or less.

According to the present invention, superior storage stability can be attained because conductance of an aqueous solution containing 1 mass % of a solid content of the resin emulsion is low, that is, an ionic groups and its counter ion, or ionic impurities dissolved in the resin emulsion are low. Therefore, the dispersion stability of the surface-treated pigment is not impaired. Also, according to the present invention, since the pigment dispersion containing the surface-treated pigment obtained by binding a functional group, having a large calcium index, to the surface of a pigment is used, an ink composition which is resistant to bleeding, has good fixability to paper and enables printing of a clear image can be obtained.

Also, the present invention provides an ink composition comprising a pigment dispersion containing a surface-treated pigment and a resin emulsion, wherein the surface-treated pigment is obtained by binding a functional group, having a larger calcium index than a calcium index of 1,2,3-benzenetricarboxylic acid, to the surface of a pigment; and the pigment dispersion and the resin emulsion satisfy the following equation (1) when a conductance of an aqueous solution containing 1 mass % pigment of the pigment dispersion is referred to as A (μS/cm) and a conductance of an aqueous solution containing 1 mass % of a solid content of the resin emulsion is referred to as B (μS/cm):

$$A \times B < 4.0 \times 10^4 \qquad (1).$$

According to the present invention, the influence of an ionic group and its counter ion, or ionic impurities contained in the resin emulsion on the dispersibility of the pigment dispersion is reduced and superior storage stability can be attained by decreasing the value of the product of the conductance of the aqueous solution containing 1 mass % pigment of the pigment dispersion and the conductance of the aqueous solution containing 1 mass % of a solid content of the resin emulsion. Also, according to the present invention, the pigment dispersion containing the surface-treated pigment obtained by binding a functional group, having a large calcium index, to the surface of a pigment is used, an ink composition which is resistant to bleeding, has good fixability to paper and enables printing of a clear image can be obtained.

In the above invention, it is preferable that a content of the pigment of the pigment dispersion is in a range of 0.5 mass % to 20 mass % of a total amount of the ink composition, the solid content of the resin emulsion is in a range of 0.5 mass % to 20 mass % of the total amount of the ink composition, and a sum of a solid content of the pigment of the pigment dispersion and a solid content of the resin emulsion is in a range of 1.0 mass % to 20 mass % of the total amount of the ink composition.

In the above invention, it is preferable that the ink composition further comprising a water-soluble organic solvent.

In the above invention, it is preferable that the water-soluble organic solvent is contained in a range of 10 mass % to 70 mass % of the total amount of the ink composition.

Also, in view of the above problem of prior art, in an ink composition comprising at least a pigment, a resin emulsion, and an aqueous solvent containing a surfactant, it has been found that a clear image can be obtained by modifying the resin forming the resin emulsion to be added for the purpose of improving fixability of the pigment by binding a specific phosphorous-containing group to the resin, thereby inhibiting bleeding in printing on a print paper using the ink composition and improving fixability by utilizing the reactivity of the phosphorous-containing functional group with calcium ions contained in the printing paper. Thus the present invention was completed.

The present invention provides an ink composition comprising at least a pigment, a resin emulsion, and an aqueous solvent containing a surfactant, wherein one or two or more phosphorous-containing functional groups, containing at least one P—O or P═O bond, are bounded to a resin forming the resin emulsion.

According to the present invention, when piezo system inkjet recording device is used, clogging is inhibited, enabling stable discharge of ink, and the bleeding of ink is restrained, improving fixability of ink to paper, making possible to obtain a clear image.

In the above invention, it is preferable that the phosphorous-containing functional group is one or two or more types selected from a phosphonic acid group, a phosphinic acid group, a phosphinous acid group, a phosphite group, a phosphate group, a diphosphate group, a triphosphate group, and a pyrophosphate group, and partially esters and salts of these groups. This is because the phosphorous-containing group containing a P—O or P═O bond in the resin emulsion tends to coordination-bind with calcium contained in paper and therefore, the fixability of the pigment to a printing paper is more improved, which can inhibit the bleeding of ink efficiently.

In the above invention, it is preferable that the average particle diameter of the resin emulsion is 500 nm or less. This is because the abrasion resistance of an image is improved when the average particle diameter of the resin in the ink is 500 nm or less.

In the above invention, it is preferable that an aqueous solution containing 1 mass % of a solid content of the resin emulsion has a conductance of 300 μS/cm or less. When the aqueous solution containing 1 mass % of a solid content of the resin emulsion has a conductance of 300 μS/cm or less, the reactivity between the resin emulsion and the surface-treated pigment can be reduced and therefore, the dispersibility of the surface-treated pigment is improved when the resin emulsion is mixed with the pigment dispersion containing the surface-treated pigment to prepare ink, ensuring that the storage stability of the ink composition can be improved.

In the above invention, it is preferable that the pigment is obtained by binding a functional group, having a larger calcium index than a calcium index of 1,2,3-benzenetricarboxylic acid, to the surface thereof. When the pigment is obtained by binding a functional group, having a larger calcium index than a calcium index of 1,2,3-benzenetricarboxylic acid, to the surface thereof, the bleeding of the pigment is more inhibited, making the fixability to paper better, enabling the production of an ink composition ensuring the printing of a more clear image.

In the above invention, it is preferable that the resin emulsion is contained in the ink composition in a range of 0.05 mass % to 20 mass % as a solid content in the ink composition. When the modified resin emulsion is contained in the ink composition in a range of 0.05 mass % to 20 mass % as a solid content, the fixability of the pigment to paper is improved.

In the above present invention, it is preferable that the pigment is contained in a range of 0.05 mass % to 20 mass %, the resin emulsion is contained in a range of 0.05 mass % to 20 mass % as a solid content, and also a sum of the solid contents of the pigment and the resin emulsion is in a range of 0.1 mass % to 30 mass %. This is because when the pigment is contained in a range of 0.05 mass % to 20 mass % as a solid content, the resin emulsion is contained in a range of 0.05 mass % to 20 mass % as a solid content, and also a sum of the solid contents of the pigment and the resin emulsion is in a range of 0.1 mass % to 30 mass % in the ink composition, a high resolution print product reduced in the bleeding of ink can be obtained.

In the above invention, it is preferable that 3-methoxy-3-methyl-1-butanol is contained in a range of 0.5 mass % to 25 mass % in the ink composition. This is because if 0.5 to 25 mass % of 3-methoxy-3-methyl-1-butanol is contained in the ink composition, dispersion stability and quick-drying ability are improved.

Also, the ink composition of the present invention is preferably used in a piezo system inkjet recording device. The ink composition of the present invention can be used in any inkjet recording system. However, the ink composition of the present invention is preferably used in inkjet recording system adhering ink onto a recording medium by using a head utilizing a driving pressure of a piezo element operable at ambient temperature, that is, a piezo system inkjet recording device. This is because when the ink composition of the present invention as mentioned above is used in a piezo system inkjet recording device, the clogging of the inkjet head is inhibited so that stable ejection of ink is possible.

In the above invention, it is preferable that the ink composition comprises at least glycerin or diethylene glycol.

In the above invention, it is preferable that a viscosity of the ink composition is in a range of 1.5 mPa·s to 15 mPa·s at 25° C.

In the above invention, it is preferable that a surface tension of the ink composition is in a range of 20 mN/m to 45 mN/m.

In the above invention, it is preferable that pH of the ink composition is in a range of 7 to 11.

The present invention further provides a recorded product having images printed on a paper by using the above-mentioned ink composition.

According to the present invention, since the above ink composition is used for printing, a clear image can be obtained without any bleeding of ink irrespective of the type of paper.

The present invention provides a recording method comprising forming images on a recording medium by using the above-mentioned ink composition.

Advantageous Effects of Invention

Effects of the present invention are that an ink composition which has superior storage stability, is resistant to bleeding, and has good fixability to paper, and enables printing of a clear image can be obtained.

DESCRIPTION OF EMBODIMENTS

Figure 1A:
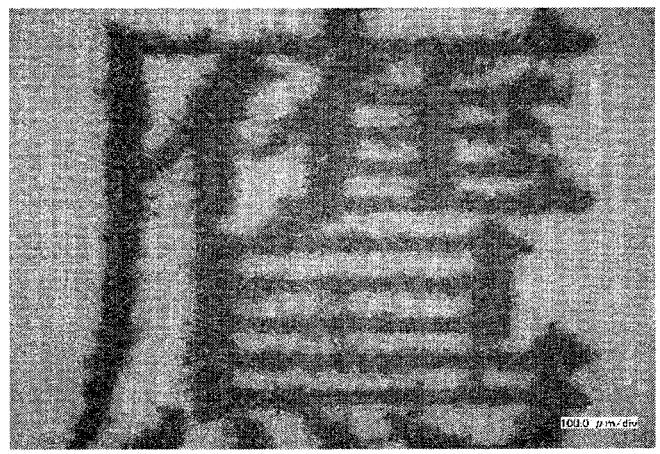
FIG. 1 is a photograph for explaining the evaluation of the reproducibility of an image in an example.

Hereinafter, an ink composition, a recording method using the ink composition and a recorded product using the ink composition according to the present invention will be explained in detail.

A. Ink Composition

First, the ink composition of the present invention will be explained.

The ink composition of the present invention can be classified into two aspects: an aspect wherein the ink composition comprises a pigment dispersion containing a surface-treated pigment and a resin emulsion, and the surface-treated pigment is obtained by binding a functional group, having a larger calcium index than a calcium index of 1,2,3-benzenetricarboxylic acid, to the surface of a pigment (Aspect A); and an aspect wherein the ink composition comprises at least a pigment, a resin emulsion, and an aqueous solvent containing a surfactant, and one or two or more phosphorous-containing functional groups, containing at least one P—O or P=O bond, are bounded to a resin forming the resin emulsion (Aspect B).

In the present invention, the term "surface-treated pigment" means a pigment obtained by binding a predetermined functional group to the surface of a pigment, and the term "pigment" means the one to which a predetermined functional group is bound onto the surface thereof.

Hereinafter, each aspect will be explained separately.

1. Aspect A

The ink composition of this aspect is the ink composition comprising a pigment dispersion containing a surface-treated pigment and a resin emulsion, wherein the surface-treated pigment is obtained by binding a functional group, having a larger calcium index than a calcium index of 1,2,3-benzenetricarboxylic acid, to the surface of a pigment. And the ink composition of this aspect can be classified into two embodiments according to the conductance of the pigment dispersion and the conductance of the resin emulsion. Specifically, in the first embodiment according to the ink composition of this aspect, the resin emulsion is adapted so that an aqueous solution containing 1 mass % of a solid content of the resin emulsion has a conductance of 300 μS/cm or less. In the second embodiment according to the ink composition of this aspect, on the other hand, the pigment dispersion and the resin emulsion satisfy the equation (1): A×B<4.0×10$^4$, when a conductance of an aqueous solution containing 1 mass % pigment of the pigment dispersion is referred to as A (μS/cm) and a conductance of an aqueous solution containing 1 mass % of a solid content of the resin emulsion is referred to as B (μS/cm).

Each embodiment will be explained separately.

(1) First Embodiment

The ink composition (hereinafter, it may be simply referred to as ink) of this embodiment comprises a pigment dispersion containing a surface-treated pigment and a resin emulsion, wherein: the surface-treated pigment is obtained by binding a functional group, having a larger calcium index than a calcium index of 1,2,3-benzenetricarboxylic acid, to the surface of a pigment; and the resin emulsion is adapted so that an aqueous solution containing 1 mass % of a solid content of the resin emulsion has a conductance of 300 μS/cm or less.

Here, "the aqueous solution containing 1 mass % of a solid content of the resin emulsion" is a solution in which a resin emulsion is dispersed in water such that the concentration of a solid content is 1 mass %.

In this embodiment, it would appear that the reactivity of the resin emulsion with the surface-treated pigment is reduced because the conductance of the aqueous solution containing 1 mass % of a solid content of the resin emulsion is low.

The low conductivity of the aqueous solution containing 1 mass % of a solid content of the resin emulsion is considered to show that the existential amount, of ionic groups and their counter ions which the resin emulsion itself contains, in the ink is small. Also, it is considered that the low conductivity of the aqueous solution containing 1 mass % of a solid content of the resin emulsion shows that the existential amount, of impurities such as ionic materials caused by the production of the resin emulsion, in the ink is small.

It is predicted that the functional group having a large calcium index in the surface-treated pigment is easily interacted with ionic groups, counter ions of these ionic groups, and ionic impurities contained in the resin emulsion. Because this functional group contributes to the dispersion stability of the surface-treated pigment, the dispersion function is deteriorated by the above interaction if ionic groups, counter ions of these ionic groups, and ionic impurities in the resin emulsion exist in large quantity in the ink. Therefore, it is considered that if the conductance of the aqueous solution containing 1 mass % of a solid content of the resin emulsion is high, the dispersion condition of the surface-treated pigment is deteriorated when the resin emulsion is mixed with the pigment dispersion containing the surface-treated pigment to prepare ink.

In this embodiment, on the other hand, it is considered that by selecting the resin emulsion adapted so that the conductance of the aqueous solution containing 1 mass % of a solid content of the resin emulsion is low, ionic groups, counter ions, and ionic impurities present in the resin emulsion are minimized, so that the interaction between the functional group having a large calcium index in the surface-treated pigment and ionic groups, counter ions, and ionic impurities in the resin emulsion, and also the coagulation of the surface-treated pigment caused by the interaction can be reduced. Therefore, in this embodiment, the storage stability of the ink composition can be improved.

Further, in the present embodiment, since the pigment dispersion containing the surface-treated pigment obtained by binding a functional group, having a large calcium index, to the surface of a pigment is used, an ink composition which is resistant to bleeding and has good fixability to paper, and enables printing of a clear image can be obtained.

Each composition in the ink composition in this embodiment will be explained.

(i) Pigment Dispersion

The pigment dispersion used in this embodiment contains a surface-treated pigment. This surface-treated pigment is one obtained by binding a functional group having a larger calcium index than a calcium index of 1,2,3-benzenetricarboxylic acid to the surface of a pigment. Each composition in the surface-treated pigment will be explained.

(a) Pigment

As a pigment to be used for the surface-treated pigment in this embodiment, an organic pigment may be used. Also, carbon black which is an inorganic pigment is used.

As the color of the pigment, any of blue, black, brown, cyan, green, white, violet, magenta, red, orange, and yellow may be used. A mixture of pigments having different colors may be used.

No particular limitation is imposed on the primary particle diameter of the pigment and the primary particular diameter is preferably, for example, in a range of 5 nm to 200 nm and particularly preferably in a range of 30 nm to 150 nm.

There is no particular limitation to the BET surface area of the pigment.

Also, no particular limitation is imposed on the dibutyl phthalate (DBP) absorption value of the pigment.

(b) Functional Group

A functional group used in the surface-treated pigment in this embodiment has a larger calcium index than a calcium index of 1,2,3-benzenetricarboxylic acid and is bounded to the surface of the pigment.

Here, the term "calcium index" indicates a measure of ability to coordination-binding dissolved calcium ions, that is, ability of the functional group which captures the calcium ions. The higher the calcium index is, the more strongly and more effectively the functional group coordination-binds the calcium ions.

As a method of measuring the calcium index, for example, a method measuring the amount of calcium coordination-bound by a compound in a standard solution containing soluble calcium ions and a color indicator using Ultraviolet-Visible spectroscopy may be adopted. Also, the calcium index of a compound having a deep color may be measured using the NMR method. Each method will be explained separately.

(Ultraviolet-Visible Spectroscopy)

An example of the Ultraviolet-Visible spectroscopy will be explained.

First, a series of solutions containing 0.087 mM of a congo-red indicator, 5 mM of cesium chloride, 1 wt % MW350 polyethylene glycol methyl ether, and calcium chloride having a concentration in a range of 0 mM to 7 mM (0.2, 0.5, 1, 2, 3, 4, 4.5, 5, 6, and 7 mM) are prepared at pH 9. The ultraviolet-visible spectrums of these solutions are recorded using a UV-2501PC within one hour after these solutions are prepared. Using these spectrums, a calibration curve showing the relation of the absorbance at 520 nm and the concentration of calcium is formed.

Next, a compound corresponding to a specific functional group bound to the surface of the pigment is selected. With regard to, for example, the surface-treated pigment with a 3,4,5-tricarboxyphenyl group or salt thereof bound to the surface thereof, 1,2,3-benzenetricarboxy acid is selected. Then, an inspection solution containing a 0.087 mM congo-red indicator, 1 wt % MW350 polyethylene glycol methyl ether, 5 mM of calcium chloride, and a cesium salt of a relative compound having an ion concentration of 5 mM at pH 9 is prepared at pH 9. The concentration of non-complexed calcium is determined by comparison with the calibration curve. In succession, the calcium index is calculated as $\log_{10}((0.005-\text{Non-complexed calcium})/((\text{Non-complexed calcium})^2))$. A duplicate test is made to measure and measured data is averaged.

The above Ultraviolet-Visible Spectroscopy is used to determine the calcium indices of various compounds relating to functional groups in the surface-treated pigment. Specific examples are shown in Table 1 below.

TABLE 1

| Compound | Calcium index |
| --- | --- |
| Toluenesulfonic acid | 0.78 |
| Benzoic acid | 1.27 |
| Isophthalic acid | 1.76 |
| Phthalic acid | 2.05 |
| Succinic acid | 2.37 |
| Benzohydroxamic acid | 2.43 |
| 1,2,4-benzenetricarboxylic acid | 2.53 |
| Bezenephosphonic acid | 2.53 |
| 1,2,3-bezenetricarboxylic acid | 2.79 |
| 2,3-dihydroxypyridine | 3.06 |
| 8-hydroxyquinoline | 3.08 |
| 2-hydroxypyridine oxide | 3.27 |
| Methylenediphosphonic acid | 3.45 |

As shown by the data in Table 1, 2-hydroxypyridine N-oxide (1-hydroxypyridone), 8-hydroxyquinoline, and methylenediphosphonic acid each have a larger calcium index than a calcium index of 1,2,3-benzenetricarboxylic acid. It is expected that compounds containing these functional groups or similar functional groups (for example, groups containing other bisphosphonates or at least two phosphonic acid groups, partial esters or salts thereof) each likewise have a large calcium index.

(NMR Method)

As to compounds having a difficulty in the application of the above Ultraviolet-Visible Spectroscopy because they have a deep color, the NMR method may be used. An example of the NMR method will be explained.

First, an aqueous solution which is 0.01 M for $^{43}CaCl_2$, 0.01 M for NaCl, and 10% for $D_2O$ and having a pH 8 or 9 is prepared from $^{43}CaCO_3$, $HCl/D_2O$, $NaOH/D_2O$, $D_2O$ and water. The pH is selected so as to ionize a compound which is an investigation object and also to dissolve the compound. A part of the solution weighing about 0.65 g is added to a 5 mm NMR tube and weighed to the order of 0.001 g. A Bruker Avance II spectrometer is used to measure the chemical shift of non-bound $^{43}Ca$ by using proton resonant frequency at 400.13 MHz. A 0.2 to 1.0 M solution of the investigation object compound (ligand) is added in continuous increments. After each of the increments, the chemical shift of $^{43}Ca$ is measured to calculate $\delta$ which is a difference between the chemical shift of a sample and the chemical shift of non-bound calcium. The continuous increments are so designed that the ratio $L_0/Ca_0$ (here, $L_0$ is a total concentration of anions which are complexed from a ligand, and protonated and are free and $Ca_0$ is a total concentration of calcium in all existing chemical species.) is 0.25, 0.5, 1, 2, 3, 4, 6, and 8. The calcium binding index (NMR) is calculated as $\log_{10}(X)$ to determine X by fitting the parameter X and $\delta_m$ in the following equation such that a difference in RMS between the data and a chemical shift estimated from the equation is minimized.

$$\delta = \frac{\delta_m}{2}\left\{[1 + (L_0/Ca_0) + (1 + H^+/K_a)/(XCa_0)] - \sqrt{[1 + (L_0/Ca_0) + (1 + H^+/K_a)/(XCa_0)]^2 - 4(L_0/Ca_0)}\right\}$$

[Math. 1]

where;

$\delta$ represents a difference between the chemical shift of $^{43}Ca$ of the sample and the chemical shift of free aqueous $^{43}Ca^{2+}$;

$\delta_m$ represents a calculated difference between the chemical shift of $^{43}Ca$ in infinite L/Ca and the chemical shift of free aqueous $^{43}Ca^{2+}$;

$L_0$ represents a total concentration of anions which are complexed from a ligand and protonated, and are free;

$Ca_0$ represents a total concentration of calcium in all existing chemical species;

X represents a parameter to be fitted; and $K_a$ represents a proton dissociation constant of a ligand LH.

The above NMR method is used to determine the calcium indices of various compounds relating to functional groups in the surface-treated pigment. Specific examples are shown in Table 2 below.

TABLE 2

| Compound | Calcium index |
| --- | --- |
| Benzoic acid | 0.58 |
| 1,2,3-benzenetricarboxylic acid | 1.99 |
| 2-chloro-4-methyl-6-nitrophenol | 2.22 |

The calcium index calculated by the NMR method is different from that calculated by the Ultraviolet-Visible Spectroscopy and cannot be therefore compared directly with the calcium index calculated by the Ultraviolet-Visible Spectroscopy.

In this embodiment, the reference for the evaluation of calcium index is 1,2,3-benzenetricarboxylic acid. The functional group bound to the surface of the pigment has a larger calcium index than a calcium index of 1,2,3-benzenetricarboxylic acid. The calcium index of the functional group is preferably above 2.8, more preferably above 3.0, and even more preferably above 3.2 when it is measured by the Ultraviolet-Visible Spectroscopy.

Any functional group may be used without any particular limitation insofar as it can be bound to the surface of a pigment and it has a larger calcium index than a calcium index of 1,2,3-benzenetricarboxylic acid. Examples of the functional group include: groups containing a phosphorous-containing group having a P—O or P=O bond, or partial ester or salt thereof (hereinafter referred to as a first configuration); groups containing a hydroxamic acid group or salt thereof (hereinafter referred to as a second configuration); groups containing a heterocyclic group containing a OH group or salt thereof (hereinafter referred to as a third configuration); groups containing a phosphonic acid group or salt thereof and a second ion group, ionic group, or basic group (hereinafter referred to as a fourth configuration); heteroaryl groups containing a carboxylic acid or salt thereof (hereinafter referred to as a fifth configuration); and groups containing a nitroso group or salt thereof and an aryl group containing a OH group or salt thereof (hereinafter referred to as a sixth configuration); and groups which contains azoarene group containing at least two OH groups, at least two $NH_2$ groups, or at least one OH group, and at least one $NH_2$ group, and also have the formula $Ar^1$—N=N—$Ar^2$ (where, $Ar^1$ and $Ar^2$, which may be the same or different, respectively represent an arylene group or an aryl group provided that at least one of $Ar^1$ and $Ar^2$ is an arylene group (hereinafter referred to as a seventh configuration).

(First Configuration)

The functional group preferably contains at least one phosphorous-containing group having at least one P—O or P=O bond. Examples of the phosphorous-containing group include a phosphonic acid group, phosphinic acid group, phosphinous acid, phosphite group, phosphate group, diphosphate group, triphosphate group, and pyrophosphate group, and partially esters or salts of these groups. Among these groups, the functional group preferably contains at least one phosphonic group, or partial ester or salt thereof and more preferably contains at least two phosphonic acid groups, or esters or salts thereof.

In this case, "its partial ester" means that the phosphonic acid group is a partial phosphonate ester group having the formula —$PO_3RH$ or salt thereof. Here, R is an aryl, alkaryl, aralkyl, or alkyl group.

When the functional group contains at least two phosphonic acid groups or salt thereof, one or both of these phosphonic acid groups may be a partial phosphonate ester group. Also, one of these phosphonic acid groups may be a phosphonate ester having the formula —$PO_3R_2$, and the other is any one of a partial phosphonate ester group, phosphonic acid group or salt thereof. Among these groups, at least one of these phosphonic acid groups is preferably a phosphonic acid, partial ester or salt thereof.

Here, "salt thereof" means that the phosphonic acid group contains a cation counter ion and is partially or completely ionized.

When the functional group contains at least two phosphonic acid groups, one or both of these phosphonic acid groups may be in either a partially ionized form or completely ionized form. Particularly, it is preferable that the functional group contains at least two phosphonic acid groups and one or both of these phosphonic acid groups have the formula —$PO_3H_2$, —$PO_3H^-M^+$ (monobasic salt), or —$PO_3^{-2}M^{+2}$ (dibasic salt). Here, $M^+$ is a cation such as $Na^+$, $K^+$, $Li^+$, or $NR_4^+$. R may be the same or different, respectively represent hydrogen or an organic group (for example, substituted or unsubstituted aryl and/or alkyl group).

When the functional group contains at least two phosphonic acid groups, examples of the functional group may include groups containing at least one geminal bisphosphonic acid, partial ester or salt thereof. Specifically, examples of the functional group include groups containing at least two phosphonic acid groups directly bound to the same carbon atom or partial esters or salts thereof. Such a group is sometimes called a 1,1-diphosphonic acid group, or partial ester or salt thereof.

Examples of such a functional group include groups having the formula —$CQ(PO_3H_2)_2$, and groups containing partial esters or salts thereof. Q is bound to the geminal position and represents H, R, OR, SR, or $NR_2$ (where R may be the same or different, respectively represent H, $C_1$ to $C_{18}$ saturated or unsaturated branched or non-branched alkyl groups, $C_1$ to $C_{18}$ saturated or unsaturated branched or non-branched acyl groups, aralkyl groups, alkaryl groups, or aryl groups). Q is, for example, H, R, OR, SR, or $NR_2$ (here, R may be the same or different, respectively represents H, or $C_1$ to $C_6$ alkyl group or aryl group), and preferably H, OH, or $NH_2$.

In this case, $C_1$ to $C_{18}$ means that the numbers of carbon atoms are 1 to 18.

Moreover, examples of the above functional group include groups having the formula —$(CH_2)_n$—$CQ(PO_3H_2)_2$, and groups containing partial esters or salts thereof. Here, Q is that mentioned above. n is 0 to 9, preferably 0 to 3, and even more preferably 0 or 1.

Also, examples of the above functional group include groups having the formula —X—$(CH_2)_n$—$CQ(PO_3H_2)_2$, and groups containing partial esters or salts thereof. Here, Q and n are those mentioned above. X represents an arylene group, heteroarylene group, alkylene group, vinylidene group, alkalylene group, aralylene group, cyclic or heterocyclic group. X is preferably an arylene group (may be further substituted with one or more optional groups such as alkyl groups, or aryl groups) such as a phenylene group, naphthalene group, or biphenylene group. When X is an alkylene group, examples of X include substituted or unsubstituted alkylene groups (may be branched or non-branched, or may be substituted with one or more groups (for example, aromatic groups)). Also, examples of X include $C_1$ to $C_{12}$ groups such as a methylene group, ethylene group, propylene group, or butylenes group. X is preferably bound directly to the pigment. This means that neither other atom nor group exists between the pigment and X.

X may be further substituted with one or more organic groups. Examples of such an organic group include R', OR', COR', COOR', OCOR', carboxylate, halogen, CN, NR'$_2$, $SO_3H$, sulfonate, sulfate, NR'(COR'), CONR'$_2$, imide, $NO_2$, phosphate, phosphonate, N=NR', SOR', NR', $SO_2R'$, and $SO_2NR'_2$. Here, R may be the same or different, respectively represent hydrogen, or branched or non-branched $C_1$ to $C_{20}$ substituted or unsubstituted and saturated or unsaturated hydrocarbons (for example, alkyl, alkenyl, alkinyl, substituted or unsubstituted aryl, substituted or unsubstituted heteroaryl, substituted or unsubstituted alkaryl, or substituted or unsubstituted aralkyl).

Moreover, examples of the above functional group include groups having the formula —X-Sp-$(CH_2)_n$—$CQ(PO_3H_2)_2$, and groups containing partial esters or salts thereof. Here, X, Q, and n are those mentioned above. Sp is a spacer group (connector between two groups). Examples of Sp include binding or connecting groups. Examples of the connecting group include —$CO_2$—, —$O_2C$—, —CO—, $OSO_2$—, —$SO_3$—, —$SO_2$—, —$SO_2C_2H_4O$—, —$SO_2C_2H_4S$—, —$SO_2C_2H_4NR''$—, —O—, —S—, —NR''—, —NR''CO—, —CONR''—, NR''$CO_2$—, —$O_2$CNR''—, —NR''CONR''—, —N(COR'')CO—, —CON(COR'')—, —NR''COCH($CH_2CO_2R''$)— and its cyclic imide, —NR''$COCH_2$CH($CO_2R''$)— and its cyclic imide, —$CH(CH_2CO_2R'')$CONR''— and its cyclic imide, —$CH(CO_2R'')$$CH_2$CONR''— and its cyclic imide (including phthalimide and maleimide), sulfonamide group (including —$SO2NR''$— and —NR''$SO_2$— group), arylene group, and alkylene groups. R'' may be the same or different and represent hydrogen or an organic group (for example, a substituted or unsubstituted aryl group or alkyl group). As shown by the structure of the above formula, the group containing at least two phosphonic acid groups or salt thereof is bound to X through the spacer group Sp. Sp is preferably —$CO_2$—, —$O_2C$—, —O—, —NR''—, —NR''CO—, or —CONR''—, —$SO_2NR''$—, —$SO_2CH_2CH_2NR''$—, —$SO_2CH_2CH_2O$— or —$SO_2CH_2CH_2S$— (where, R'' is H or a $C_1$ to $C_6$ alkyl group).

Also, when the functional group contains at least two phosphonic acid groups, examples of the functional group may include groups containing a group having at least one of formula —N—$[(CH_2)_m(PO_3H_2)]_2$, and groups containing partial ester or salt thereof. Here, m may be the same or different, denote 1 to 9, preferably 1 to 3, and more preferably 1 or 2.

Also, when the functional group contains at least two phosphonic acid groups, examples of the functional group may include groups having at least one formula —$(CH_2)_n$—N—$[(CH_2)_m(PO_3H_2)]_2$, and groups containing partial ester or salt thereof. Here, n denotes 0 to 9 (for example, 1 to 9), and preferably 0 to 3 (for example, 1 to 3). m is the same as that mentioned above.

Also, when the functional group contains at least two phosphonic acid groups, examples of the functional group may include groups having at least one of formula —X—$(CH_2)_n$—N—$[(CH_2)_m(PO_3H_2)]_2$/and groups containing partial ester or salt thereof. Here, X, m, and n are the same as those mentioned above, and X is preferably an arylene group.

Also, when the functional group contains at least two phosphonic acid groups, examples of the functional group may include groups having at least one of formula —X—Sp—$(CH_2)_n$—N—$[(CH_2)_m(PO_3H_2)]_2$, and groups containing partial ester or salt thereof. Here, X, m, n, and Sp are the same as those mentioned above.

Also, when the functional group contains at least two phosphonic acid groups, examples of the functional group may include groups having at least one of formula —CR=C$(PO_3H_2)_2$, and groups containing partial ester or salt thereof. Here, R represents H, a $C_1$ to $C_{18}$ saturated or unsaturated and branched or non-branched alkyl groups, $C_1$ to $C_{18}$ saturated or unsaturated and branched or non-branched acyl groups, aralkyl groups, alkaryl groups or aryl groups. R is preferably H, a $C_1$ to $C_5$ alkyl groups or aryl groups.

Furthermore, when the functional group contains at least two phosphonic groups, the functional group may be two or more phosphonic acid groups, and groups containing partial esters or salts thereof. Examples of such a functional group include groups having the formula —X—$[CQ(PO_3H_2)_2]_p$, and groups containing partial ester or salt thereof. X and Q are the same as those mentioned above. X is preferably an arylene group, heteroarylene group, alkylene group, alkalylene group, or aralkylene group. p denotes 1 to 4 and preferably 2.

Also, when the functional group contains at least two phosphonic acid groups, the functional group may be at least one vicinal bisphosphonic acid group, and groups containing partial ester or salt thereof. This means that these groups are adjacent to each other. Examples of such a functional group include two phosphonic acid groups bound to adjacent carbon atoms, and groups containing partial esters or salts thereof. Such a group is called a 1,2-diphosphonic acid group, or partial ester or salt thereof. Examples of the two phosphonic acid groups, and groups containing partial esters or salts thereof include an aromatic group or alkyl group. Examples of the vicinal bisphosphonic acid group include a vicinal alkyl group, or vicinal aryldiphosphonic acid group, or partial ester or salt thereof. Specific examples of the functional group include groups containing a group having the formula —$C_6H_3$—$(PO_3H_2)_2$, and groups containing partial ester or salt thereof. Here, these acid, ester or base are each located at ortho-positions to each other.

(Second Configuration)
The functional group may be those containing at least one hydroxamic acid group or salt thereof.

(Third Configuration)
The functional group may be those containing at least one heteroaryl group containing at least one OH group or salt thereof.

(Fourth Configuration)
The functional group may be those containing at least one phosphonic acid group, or partial ester or salt thereof, and at least one second ion group, ionic group, or basic group. The second group is neither a phosphonic acid group nor salt thereof.

(Fifth Configuration)
The functional group may be those containing a heteroaryl group containing at least one carboxylic acid group or salt thereof.

(Sixth Configuration)
The functional group may be those containing an aryl group containing at least one nitroso group or salt thereof and at least one OH group or salt thereof.

(Seventh Configuration)
The functional group may contain an azoaren group. Examples of such a functional group include groups containing a group having the formula $Ar^1$—N=N—$Ar^2$. Here, $Ar^1$ and $Ar^2$ may be the same or different, respectively represent an arylene group (for example, a phenylene group or naphthylene group) or aryl group (for example, a phenyl group or naphthyl group), provided that at least one of $Ar^1$ and $Ar^2$ is an arylene group. The azoaren group contains at least one and preferably at least two OH groups, and at least one and preferably at least two $NH_2$ groups, or at least one OH group and at least one $NH_2$ group. Examples of the azoaren group include those having the formula —(HO)$Ar^1$—N=N—$Ar^2$(OH) (bis-hydroxyazoaren group), —$(H_2N)Ar^1$—N=N—$Ar^2(NH_2)$ (bis-aminoazoaren group), or —(HO)$Ar^1$—N=N—$Ar^2(NH_2)$ or —$(HN_2)Ar^1$—N=N—$Ar^2$(OH) (amino-hydroxyazoaren group).

(Other Configurations)
As will be mentioned later, when a second functional group different from the aforementioned functional groups is bound to the surface of the pigment and the second functional group contains a polymer group, examples of the functional group may include groups containing an aryl or alkyl polyacid containing at least two carboxylic acid groups. Particularly, the functional group is preferably groups containing an aryl or alkyl polyacid containing at least three carboxylic acid groups. Examples of such a functional group include alkyl polyacids containing at least two acid groups, at least three or four or more acid groups (for example, at least two carboxyl acid groups, at least three or more carboxyl acid groups) and/or other acid groups. Also, examples of the functional group may include aryl polyacid groups containing at least two carboxylic acid groups. These carboxylic acids are preferably vicinal. The term "vicinal" means that these are adjacent to each other. The aryl polyacid group may be substituted with at least one group containing two neighboring carboxylic acid groups. Examples of such an aryl polyacid group include those containing a group containing three or more carboxylic acid groups wherein at least two of these carboxylic acid groups are adjacent to each other to form a vicinal dicarboxylic acid group. Examples of these include a 1,2,3- or 1,2,4-tricarboxylic acid group such as —$C_6H_2$—$(COOH)_3$ group, or 1,2,3,4- or 1,2,4,5-tetracarboxylic acid such as —$C_6H$—$(COOH)_4$ group. Other substituted patterns are possible.

The above functional group is preferably bound to the surface of the pigment to the extent that it is dispersible in water. The amount of the functional group is arbitrarily regulated corresponding to the use of the ink composition of this embodiment and the type of functional group. Specifically, the total amount of the functional group is preferably in a range of 0.01 μmol/m² to 10.0 μmol/m², more preferably in a range of 0.5 μmol/m² to 5.0 μmol/m², even more preferably in a range of 1 μmol/m² to 3 μmol/m², and even more preferably in a range of 2 μmol/m² to 2.5 μmol/m², based on pigment surface area (when measured by nitrogen adsorption (BET method)).

The functional group is preferably bound directly to the surface of the pigment.

(c) Second Functional Group
In this embodiment, a second functional group different from the above functional groups may be bounded to the surface of the pigment. The second functional group may be the same as those described in the specification of U.S. Pat. No. 5,630,868.

Examples of the second functional group include groups containing at least one ion group, at least ionic group, or a mixture of them.

Particularly, the second functional group preferably has a larger calcium index than a calcium index of phenylphosphonic acid.

Also, examples of the second functional group include a polymer group. The second functional group is preferably a binding polymer group containing a polymer. As a method of forming the polymer of the polymer group, a general method may be used.

(d) Surface-Treated Pigment and Pigment Dispersion

In this embodiment, the surface-treated pigment obtained by binding a functional group to the surface thereof may be produced, for example, by the methods described in each specification of U.S. Pat. Nos. 5,554,739; 5,707,432; 5,837,045; 5,851,280; 5,885,335; 5,895,522; 5,900,029; 5,922,118; and 6,042,643, and in the gazette of Internal Publication No. 99/23174.

Also, the surface-treated pigment may be produced, for example, by reacting a reaction agent having a functional group with a pigment containing other functional group reactive with the above functional group as described in the specification of U.S. Pat. No. 6,723,783.

Moreover, surface-treated carbon black may be manufactured, for example, by the methods described in the specifications of U.S. Pat. Nos. 6,831,194 and 6,660,075, U.S. Patent Application Publication Nos. 2003-0101901 and 2001-0036994, CA Patent No. 2,351,162, and EP Patent No. 1,394,221, in the gazette of International Publication No. 04/63289, and in N. Tsubokawa, Polym. Sci., 17, 417, 1992.

The surface-treated pigment obtained by binding a polymer group to the surface thereof as the second functional group may be produced, for example, by the methods described in the specifications of U.S. Pat. Nos. 5,085,698, 5,998,501, 6,074,467 and 6,852,777, and in the gazette of International Publication No. 2004/111140.

Moreover, the surface-treated pigment obtained by binding a functional group and a second functional group (polymer group) to the surface thereof may be produced, for example, by a reaction of a functional group of a polymer with a functional group of a pigment (see, for example, the specifications of U.S. Pat. No. 6,723,783 or EP Patent No. 0,272,127) (including reactions between a terminal functional polymer and a pigment), or a reaction between an amine-containing functional group of a polymer (including a terminal function polymer) and a diazotizing agent (then reacted with a pigment) (see, for example, the specification of U.S. Pat. No. 6,478,863).

Also, the surface-treated pigment obtained by binding a functional group and a second functional group (polymer group) to the surface thereof may be produced by polymerization of a monomer from the pigment. For example, the surface-treated pigment obtained by binding a functional group and a second functional group (polymer group) to the surface thereof may be produced by radical polymerization which is a controlled polymerization (for example, atom transfer radical polymerization (ATRP), stable free radical (SFR) polymerization, and reversible addition-fragmentation chain transfer polymerization (RAFT)), ion polymerization (anion or cation) (for example, group transfer polymerization (GTP)), and condensation polymerization.

Moreover, the surface-treated pigment obtained by binding a functional group and a second functional group (polymer group) to the surface thereof may be produced, for example, by the methods described in the specifications of U.S. Pat. Nos. 6,372,820; 6,350,519; 6,551,393; and 6,368,239, or in the gazettes of International Publication Nos. 2006/086599 and 2006/086660.

The form of the surface-treated pigment may be any of a solid form such as a powder or a paste or a dispersion solution form. For example, the surface-treated pigment may be prepared in the form of a dispersion solution and may be isolated in the form of solid from the dispersion solution by spray drying. The surface-treated pigment preferably has the form of a dispersion solution. In this case, this is a pigment dispersion.

The pigment dispersion may be purified by cleaning including, for example, filtration or centrifugation or a combination of these two methods to remove unreacted raw materials, by-produced salts, and other reaction impurities. The products may be isolated, for example, by vaporization or may be recovered by filtration and drying.

The surface-treated pigment can be dispersed in a liquid medium and may be made into a pigment dispersion. The pigment dispersion may be refined or classified to remove impurities and other undesirable free chemical species which can coexist in this pigment dispersion. For example, the pigment dispersion may be refined by using ultrafiltration/diafiltration, reverse osmosis or ion exchange to remove undesirable free chemical species such as unreacted treating agents. In particular, the concentration of large grains of the surface-treated pigment is preferably decreased to improve overall dispersion stability. For example, particles having a grain size larger than 500 nm can be removed by using centrifugation or the like.

No particular limitation is imposed on the content of the pigment dispersion as long as sufficient image density can be attained. Specifically, the content of the pigment of the pigment dispersion is preferably in a range of 0.5 mass % to 20 mass % based on the total amount of the ink composition. In this case, the sum of the solid contents of the pigment of the pigment dispersion and resin emulsion is preferably in a range of 1.0 mass % to 20 mass % based on the total amount of the ink composition.

The pigment dispersion may contain a basic material as a counter ion for dispersion of the pigment and an antiseptic.

(ii) Resin Emulsion

The resin emulsion used in this embodiment is adapted so that the aqueous solution containing 1 mass % of a solid content of the resin emulsion has a conductance of 300 μS/cm or less.

The conductance of the aqueous solution containing 1 mass % of a solid content of the resin emulsion is 300 μS/cm or less, preferably 200 μS/cm or less, and more preferably 150 μS/cm or less. If the above conductance is high, there is a fear that an ionic group, its counter ion and ionic impurities in the resin emulsion affect the dispersion stability of the surface-treated pigment. Because the influence on the dispersibility of the surface-treated pigment is limited by reducing ions in the resin emulsion, the conductance of the aqueous solution containing 1 mass % of a solid content of the resin emulsion is lower, the better. The lower limit of the conductance is about 20 μS/cm. A resin emulsion having an excessively low conductance is deteriorated in the dispersibility and has difficulty in the production of a stable and high-quality resin emulsion.

As a method for measuring the conductivity, a method is adopted in which, first, the resin emulsion is diluted with ion exchange water so as to be a solid content of 1 mass %, thereby preparing the aqueous solution containing 1 mass % of a solid content of the resin emulsion, and then, the aqueous solution containing 1 mass % of a solid content of the resin emulsion is subjected to an EC Testr 11+ manufactured by Eutech Instruments to measure the conductance.

Though any resin emulsion may be used without any particular limitation as long as it satisfies the above requirement for conductance, the continuous phase of the resin emulsion is preferably water and the dispersion phase is preferably a (meth)acryl resin, styrene resin, vinyl resin, vinyl chloride resin, vinyl acetate resin, vinyl type copolymer resin such as a butyral resin, styrene-acryl resin, polyester resin, polyamide resin, polyethylene resin, urethane resin, urethane-acryl resin, cellulose resin, epoxy resin, silicone resin, silicone-acryl resin, rosin resin, acrylamide resin, (meth), or a mixture of these resins. Particularly, the dispersion phase preferably contains a (meth)acryl resin, acryl resin containing an acid group such as (meth)acrylic acid and/or styrene-acryl resin or a mixture of them. The dispersion phase more preferably contains a (meth)acryl resin.

Also, a hydrophilic group such as an acid group and basic group, or crosslinking group such as a silanol group may be added according to the need.

Moreover, with regard to these resins, any copolymer form may be used without any particular limitation and for example, the copolymer form of these resins may be any of a block copolymer, random copolymer, and the like.

An emulsifier may be used or may not be used in the synthesis of the resin emulsion. As an emulsifier, for example, an anionic surfactant, nonionic surfactant, or amphoteric surfactant may be used. Also, a reactive surfactant may be used.

As a polymerization initiator, potassium persulfate, ammonium persulfate, hydrogen persulfate, azobisisobutyronitrile, benzoyl peroxide, dibutyl peroxide, peracetic acid, cumenehydroperoxide, t-butylhydroxy-peroxide, paramenthanehydroxy-peroxide may be used.

As the chain transfer agent for polymerization, t-dodecylmercaptan, n-dodecylmercaptan, n-octylmercaptan, xanthogenes such as dimethylxanthogene disulfide and diisobutylxanthogene disulfide, dipentene, indene, 1,4-cyclohexadiene, dihydrofuran, xanthene, or the like may be used.

Also, as a neutralizer, an acid or base may be used corresponding to the type of a salt-generating group. Examples of the acid include inorganic acids such as hydrochloric acid and sulfuric acid, and organic acids such as acetic acid, propionic acid, lactic acid, succinic acid, glycolic acid, gluconic acid, and glyceric acid. Examples of the base include tertiary amines such as trimethylamine and triethylamine, alkanol amines such as ammonia and triethanolamine, sodium hydroxide and potassium hydroxide.

There is no particular limitation to the degree of neutralization. Although the resin emulsion preferably has a pH of 7 to 10, it is necessary that the concentration of ionic components be so properly regulated that the conductance of the resin emulsion does not become high.

The conductance of the aqueous solution containing 1 mass % of a solid content of the resin emulsion can be regulated, for example, by the type of resin component, monomer type, reaction mechanism, type of emulsifier, presence or absence of an emulsifier, and type of a neutralizer.

The molecular weight of the resin emulsion is preferably 1,000 or more and more preferably about 1,000 to 100,000.

The solid content of the resin emulsion may be, for example, about 0.5 mass % to 20 mass % based on the total amount of the ink composition though no particular limitation is imposed on the resin emulsion content. In this case, as mentioned above, the sum of the solid contents of the pigment of the pigment dispersion and resin emulsion is preferably in a range of 1.0 mass % to 20 mass % based on the total amount of the ink composition.

(iii) Solvent

The ink composition of this embodiment generally contains a solvent. As a solvent, a water-soluble organic solvent, water, or a mixture of them is used.

Examples of the water-soluble organic solvent include alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol, and n-pentanol, monohydric alcohols such as 3-methoxy-3-methyl-1-butanol, 3-methoxy-1-propanol, 1-methoxy-2-propanol, and 3-methoxy-n-butanol; amides such as dimethylformamide and dimethylacetamide; ketones or keto-alcohols such as acetone and diacetone alcohol; ethers such as tetrahydrofuran and dioxane; oxyethylene or oxypropylene copolymers such as polyethylene glycol and polypropylene glycol; diols such as ethylene glycol, propylene glycol, diethylene glycol, dipropylene glycol, 1,3-propylene glycol, isopropylene glycol, isobutylene glycol, trimethylene glycol, triethylene glycol, tripropylene glycol, tetraethylene glycol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, and 3-methyl-1,5-pentanediol; trials such as glycerin, trimethylolethane, trimethylolpropane, and 1,2,6-hexanetriol; tetrahydric alcohols such as mesoerythritol and pentaerythritol; monoalkyl ethers such as ethylene glycol monomethyl (or ethyl, isopropyl, n-butyl, isobutyl, n-hexyl, or 2-ethylhexyl)ether, diethylene glycol monomethyl (or ethyl, isopropyl, n-butyl, isobutyl, n-hexyl, or 2-ethylhexyl) ether, triethylene glycol monomethyl (or ethyl, isopropyl, n-butyl, or isobutyl)ether, propylene glycol monomethyl (or ethyl, isopropyl, n-butyl, or isobutyl)ether, and dipropylene glycol monomethyl (or ethyl, isopropyl, n-butyl, or isobutyl) ether; dialkyl ethers of polyhydric alcohols such as diethylene glycol dimethyl ether, diethylene glycol diethyl ether, diethylene glycol ethylmethyl ether, triethylene glycol dimethyl ether, triethylene glycol diethyl ether, tetraethylene glycol dimethyl ether, tetraethylene glycol diethyl ether, propylene glycol dimethyl ether, propylene glycol diethyl ether, dipropylene glycol dimethyl ether, and dipropylene glycol diethyl ether; alkanolamines such as monoethanolamine, diethanolamine, triethanolamine, N-methylethanolamine, N-ethylethanolamine, N-butylethanolamine, N-methyldiethanolamine, N-ethyldiethanolamine, and N-butyldiethanolamine; nitrogen-containing heterocyclic compounds such as N-methyl-2-pyrrolidone, 2-pyrrolidone, and 1,3-dimethyl-2-imidazolidinone; and cyclic compounds such as γ-butyrolactone and sulfolane. These water-soluble organic solvents may be used either singly or in the combinations thereof.

Also, not usual water containing various ions but deionized water is preferably used as the above water.

When the ink composition contains water, the content of water may be designed to be in a range of about 30 mass % to 90 mass % and preferably in a range of 40 mass % to 80 mass % based on the total amount of the ink composition, though no particular limitation is imposed on it.

Also, the content of the water-soluble organic solvent is preferably in a range of 10 mass % to 70 mass % and more preferably in a range of 20 mass % to 50 mass %. When the content of the water-soluble organic solvent is less than 10%, there is the case where the stability of ink is impaired by the evaporation of water. When the content of the water-soluble organic solvent exceeds 70 mass %, the viscosity of an ink increases and therefore the discharging ability may become unstable.

(iv) Surfactant

The ink composition of this embodiment generally contains a surfactant.

Though no particular limitation is imposed on the surfactant, a silicone type surfactant, a fluorine type surfactant and/or acetylene glycol type surfactant are preferably used. Specific examples of the surfactant include Surfynols 104, 82, 465, and 485, or TG (all of these products are acetylene glycol type surfactants, manufactured by Air Products Japan, Inc.), Surflon (fluorine-type surfactant; manufactured by AGC Seimi Chemical Co., Ltd.), and BYK302, 307, 331, and 348 (all of these products are silicone type surfactants; manufactured by BYK Japan K.K.).

The content of the surfactant is properly adjusted corresponding to the water-soluble organic solvent and the content of other surfactants. The content of the surfactant may be in a range of about 0.01 mass % to 3 mass % and preferably in a range of 0.1 mass % to 1.5 mass %, based on the total amount of the ink composition.

(v) Additives

The ink composition of this embodiment may contain other optional components besides the above components. For example, an antiseptic, antioxidant, conductivity regulator, pH regulator, viscosity regulator, surface tension regulator, antifoaming agent, and oxygen absorber may be added in the ink composition of this embodiment. Also, the ink composition preferably contains, according to the need, a penetrant, wetting agent, dispersion stabilizer, quick-drying improver, and the like which will be explained later. In this embodiment, a solvent having a higher boiling point than water and a solvent having a lower vapor pressure than water are preferably contained as a wetting agent with the intension of maintaining the moisture retentivity of ink. Particularly, at least glycerin or diethylene glycol is preferably included as the wetting agent.

(vi) Use

Although the ink composition of this embodiment can be used as general printing ink or paints, it is particularly preferably used for inkjet ink. Also, as inkjet ink, the ink composition may be applied to any of a piezo system, thermal system, and electrostatic system inkjet recording devices. The ink composition of this embodiment is particularly preferably used in a piezo system inkjet recording device. A piezo system recording head uses a piezoelectric vibrator as a pressure generator and increases/decreases the pressure in a pressure room by the deformation of the piezoelectric vibrator (for example, a single cavity model, double cavity model, bender model, piston model, share mode model, and shared wall model) to thereby discharge ink droplets. In such a recording head, attempts have been made to further improve a high-quality image and recording speed. An attempt to increase the kinds of recordable colors by increasing the number of nozzle rows has been made to further improve a high-quality image. Also, an attempt to increase the number of nozzle openings constituting one nozzle row has been made to improve recording speed. However, if the head nozzle is microsized, flight bending and nozzle clogging are easily caused by stuck and left ink. Also, when coagulates are generated in ink components in long-term use, this is a hindrance to the flight of ink droplets, causing troubles such as flight bending and discharging defect of ink. For this, it is of urgent necessity to develop an ink composition which does not cause clogging of an ink jet head and can be stably discharged. Accordingly, as compared with a system, such as a thermal jet which easily generates coagulates by heating, the piezo system inkjet is more resistant to the generation of coagulates due to its driving scheme, and also, the ink composition of the present invention can further inhibit the generation of coagulates. Therefore, the ink composition of the present invention is suitable to a piezo system inkjet recording device.

(vii) Others

The viscosity of the ink composition in this embodiment is preferably in a range of 1.5 mPa·s to 15 mPa·s and more preferably in a range of 2.0 mPa·s to 10 mPa·s at 25° C. though no particular limitation imposed on the viscosity as long as it can satisfy desired coatability and the viscosity is optionally determined according to use and the like.

Examples of a method of measuring the viscosity include methods using a viscosity measuring device such as a rheometer, B-type viscometer, or capillary type viscometer, though no particular limitation is imposed on the method as long as it is a method capable of measuring viscosity with high accuracy.

The surface tension of the ink composition in this embodiment is preferably in a range of 20 mN/m to 45 mN/m at 25° C. When the surface tension is less than 20 mN/m, the ink composition wet-spreads or bleeds on the surface of the inkjet recording printer head, so that discharging of the ink droplets will be difficult in some cases. When the surface tension exceeds 50 mN/m on the other hand, there is the case where the ink composition does not wet-spread on the surface of a recording medium, bringing about unsatisfactory printing and the case where drying time will be longer because the penetration of the ink composition becomes slow.

Examples of a method of measuring the surface tension include the Wilhelmy method (plate method), suspension-drop method (pendant/drop method), Young-Laplace method, and du Nouy method, though no particular limitation is imposed on the method insofar as it can measure the viscosity with high accuracy.

Although there is no particular limitation to the pH of the ink composition in this embodiment as long as desired coatability is obtained and the pH is properly determined correspondingly to use and the like, the pH is preferably in a range of 7 to 11. This is because the pigment dispersion and resin emulsion in the ink can stably exist in the ink and the stability of the ink can be well kept when the pH is adjusted in this range.

(2) Second Embodiment

The ink composition of this embodiment comprises a pigment dispersion containing a surface-treated pigment and a resin emulsion, and the surface-treated pigment is obtained by binding a functional group having a larger calcium index than a calcium index of 1,2,3-benzenetricarboxylic acid to the surface of a pigment and the pigment dispersion and the resin emulsion satisfy the following equation (1) when the conductance of an aqueous solution containing 1 mass % pigment of the pigment dispersion is referred to as A (μS/cm) and the conductance of an aqueous solution containing 1 mass % of a solid content of the resin emulsion is referred to as B (μS/cm):

$$A \times B < 4.0 \times 10^4 \quad (1)$$

Here, the description "an aqueous solution containing 1 mass % pigment of the pigment dispersion" means a solution obtained by dispersing the pigment dispersion in water such that the concentration of the pigment is 1 mass %.

In this embodiment, the product value of the conductance of the aqueous solution containing 1 mass % pigment of the pigment dispersion and conductance of the aqueous solution containing 1 mass % of a solid content of the resin emulsion is made to be small, to thereby restrain the amount of free ions contained in the pigment dispersion and resin emulsion to the minimum, thereby maintaining the dispersibility of the pigment dispersion, making it possible to keep the dispersion stability of the ink.

The pigment dispersion containing a surface-treated pigment containing many functional groups having a large calcium index on the surface thereof tends to have a high conductance, and the lower conductance of the solution containing 1 mass % of a pigment of the pigment dispersion is considered to show that a small amount of a functional group having a large calcium index exists in the surface-treated pigment.

On the other hand, the lower conductance of the aqueous solution containing 1 mass % of a solid content of the resin emulsion is considered to show that ionic groups and counter ions of these ionic groups which the resin emulsion itself contains exist in a slight amount in the ink. Also, the lower conductance of the aqueous solution containing 1 mass % of a solid content of the resin emulsion is considered to show that impurities such as ionic materials originated from the production of the resin emulsion are contained in a small amount in the ink.

It is predicted that the functional group having a large calcium index in the surface-treated pigment tends to interact with ionic groups, counter ions of these ionic ions and ionic impurities contained in the resin emulsion. Because this functional group contributes to the dispersion stability of the surface-treated pigment, the dispersion function is deteriorated by the above interaction if ionic groups, counter ions, and ionic impurities included in the resin emulsion are contained in a large amount in the ink. Therefore, when the conductance of the aqueous solution containing 1 mass % of a solid content of the resin emulsion is high, the dispersion condition of the surface-treated pigment is considered to be impaired when the resin emulsion is blended with the pigment dispersion containing the surface-treated pigment to prepare ink.

On the other hand, if the conductance of the aqueous solution containing 1 mass % of a solid content of the resin emulsion is relatively low, ionic groups, counter ions of these ionic groups and ionic impurities in the resin emulsion exist only in a small amount. It is predicted that the interaction between the functional group having a large calcium index in the surface-treated pigment and the ionic groups, counter ions, and ionic impurities in the resin emulsion is reduced. Therefore, even in the case where the conductance of the aqueous solution containing 1 mass % pigment of the pigment dispersion is slightly high, it is considered that the interaction between the functional group having a large calcium index in the surface-treated pigment and the ionic groups, counter ions, and ionic impurities in the resin emulsion, and also, the coagulation of the surface-treated pigment caused by the interaction are reduced if the conductance of the aqueous solution containing 1 mass % of a solid content of the resin emulsion is relatively low.

Similarly, if the conductance of the aqueous solution containing 1 mass % pigment of the pigment dispersion is relatively low, the functional group having a large calcium index in the surface-treated pigment exists only in a small amount. It is therefore predicted that the interaction between the functional group having a large calcium index in the surface-treated pigment and the ionic groups, counter ions, and ionic impurities in the resin emulsion is reduced. Therefore, even in the case where the conductance of the aqueous solution containing 1 mass % of a solid content of the resin emulsion is slightly high, it is considered that the interaction between the functional group having a large calcium index in the surface-treated pigment and the ionic groups, counter ions, and ionic impurities in the resin emulsion, and also, the coagulation of the surface-treated pigment caused by the interaction are reduced if the conductance of the aqueous solution containing 1 mass % pigment of the pigment dispersion is relatively low.

In light of this, this embodiment uses the amount of ionic components in the pigment dispersion and resin emulsion as an index and adopts the product of the conductance of the aqueous solution containing 1 mass % pigment of the pigment dispersion and conductance of the aqueous solution containing 1 mass % of a solid content of the resin emulsion. Even if the conductance of the aqueous solution containing 1 mass % pigment of the pigment dispersion is slightly high, the product value of the conductance of the aqueous solution containing 1 mass % pigment of the pigment dispersion and conductance of the aqueous solution containing 1 mass % of a solid content of the resin emulsion becomes smaller than a predetermined value if the conductance of the aqueous solution containing 1 mass % of a solid content of the resin emulsion is relatively low. Similarly, even if the conductance of the aqueous solution containing 1 mass % of a solid content of the resin emulsion is slightly high, the product value of the conductance of the aqueous solution containing 1 mass % pigment of the pigment dispersion and conductance of the aqueous solution containing 1 mass % of a solid content of the resin emulsion becomes smaller than a predetermined value if the conductance of the aqueous solution containing 1 mass % pigment of the pigment dispersion is relatively low.

Specifically, in this embodiment, it would appear that the interaction between the functional group having a large calcium index in the surface-treated pigment and the ionic groups, counter ions, and ionic impurities in the resin emulsion can be reduced by reducing the product value of the conductance of the aqueous solution containing 1 mass % pigment of the pigment dispersion and conductance of the aqueous solution containing 1 mass % of a solid content of the resin emulsion.

Here, with regard to the conductance, the object are the aqueous solution containing 1 mass % pigment of the pigment dispersion and the aqueous solution containing 1 mass % of a solid content of the resin emulsion. Because the actual solid content of the pigment of the pigment dispersion and the actual solid content of the resin emulsion in the ink composition are not taken into account in the product value of the conductance of the aqueous solution containing 1 mass % pigment of the pigment dispersion and conductance of the aqueous solution containing 1 mass % of a solid content of the resin emulsion, there is a fear as to whether or not the relation is established between the product value of the conductance of the aqueous solution containing 1 mass % pigment of the pigment dispersion and the conductance of the aqueous solution containing 1 mass % of a solid content of the resin emulsion and the dispersion stability when the both are blended as the ink even in the case where the solid contents of the pigment of the pigment dispersion and resin emulsion are respectively altered. However, in general, each solid content of the pigment of the pigment dispersion and resin emulsion is not altered in a wide range but altered in a narrow range when an ink composition is prepared, and therefore, this embodiment adopts the product of the conductance of the aqueous solution containing 1 mass % pigment of the pigment dispersion and the conductance of the aqueous solution containing 1 mass % of a solid content of the resin emulsion in which the actual solid content of the pigment of the pigment dispersion and the actual solid content of the resin emulsion in the ink composition are not taken into account.

Each composition of the ink composition of this embodiment will be explained.

(i) Product of the conductance of an aqueous solution containing 1 mass % pigment of the pigment dispersion and the conductance of an aqueous solution containing 1 mass % of a solid content of the resin emulsion In this embodiment, the pigment dispersion and the resin emulsion satisfy the following equation (1): $A \times B < 4.0 \times 10^4$, when the conductance of an aqueous solution containing 1 mass % pigment of the pigment dispersion is A ($\mu$S/cm) and the conductance of an aqueous solution containing 1 mass % of a solid content of the resin emulsion is B ($\mu$S/cm).

The value of $A \times B$ is a parameter showing the degree of the influence of ionic groups, counter ions of these ionic ions, and ionic impurities in the resin emulsion on the surface-treated pigment and therefore, the smaller the value is, the better. The lower limit of $A \times B$ is not particularly limited. In the case where the value of $A \times B$ is too small, the conductance of the aqueous solution containing 1 mass % pigment of the pigment dispersion is too low or the conductance of the aqueous solution containing 1 mass % of a solid content of the resin emulsion is too low, which makes it difficult to produce the pigment dispersion or resin emulsion having stable dispersibility.

No particular limitation is imposed on the conductance of the aqueous solution containing 1 mass % pigment of the pigment dispersion as long as it satisfies the above equation (1). If the conductance is too low, there is a fear concerning low reactivity with a calcium salt and the like, leading to deteriorated fixability of ink to paper.

Here, the conductance of the aqueous solution containing 1 mass % pigment of the pigment dispersion may be measured by the same method as that used to measure the aqueous solution containing 1 mass % of a solid content of the resin emulsion as described in the first embodiment.

No particular limitation is imposed on the conductance of the aqueous solution containing 1 mass % of a solid content of the resin emulsion as long as it satisfies the above equation (1), the conductance is preferably the same as that of the aqueous solution containing 1 mass % of a solid content of the resin emulsion in the first embodiment.

(ii) Pigment Dispersion

The pigment dispersion used in this embodiment contains the surface-treated pigment. This surface-treated pigment is obtained by binding a functional group, having a larger calcium index than a calcium index of 1,2,3-benzenetricarboxylic acid, to the surface of a pigment. Also, the pigment dispersion satisfies the following equation (1): $A \times B < 4.0 \times 10^4$, when the conductance of an aqueous solution containing 1 mass % pigment of the pigment dispersion is A ($\mu$S/cm) and the conductance of an aqueous solution containing 1 mass % of a solid content of the resin emulsion is B ($\mu$S/cm).

Though no particular limitation is imposed on the content of the pigment dispersion insofar as a sufficient image density can be attained, specifically, the content of the pigment of the pigment dispersion is in a range of 0.5 mass % to 20 mass % based on the total amount of the ink composition. In this case, the sum of the content of the pigment of the pigment dispersion and content of the resin emulsion is preferably in a range of 1.0 mass % to 20 mass % based on the total amount of the ink.

Other points of the surface-treated pigment and pigment dispersion are the same as those described in the first embodiment and therefore, the explanations of these points are omitted here.

The conductance of the aqueous solution containing 1 mass % pigment of the pigment dispersion may be adjusted, for example, by the type of functional group, amount of the functional group, type of second functional group and amount of the second functional group.

(iii) Resin Emulsion

The resin emulsion used in this embodiment satisfies the following equation (1): $A \times B < 4.0 \times 10^4$, when the conductance of an aqueous solution containing 1 mass % pigment of the pigment dispersion is A ($\mu$S/cm) and the conductance of an aqueous solution containing 1 mass % of a solid content of the resin emulsion is B ($\mu$S/cm).

The solid content of the resin emulsion is preferably in a range of 0.5 mass % to 20 mass % based on the total amount of the ink composition. In this case, the sum of the solid content of the pigment of the pigment dispersion and solid content of the resin emulsion is preferably in a range of 1.0 mass % to 20 mass % based on the total amount of the ink composition as mentioned above.

Other points of the resin emulsion are the same as those described in the first embodiment and therefore, the explanations of these points are omitted here.

(iv) Others

The ink composition of this embodiment generally contains a solvent and a surfactant similarly to the above first embodiment and also additives.

Also, the ink composition of this embodiment is preferably used for inkjet ink similarly to the first embodiment and more preferably used in a piezo system inkjet recording device.

Also, the viscosity, surface tension and pH of the ink composition of this embodiment may be designed to be the same as those in the first embodiment.

2. Aspect B

Next, the aspect B of the ink composition of the present invention will be explained.

The ink composition of this aspect comprises at least a pigment, a resin emulsion, and an aqueous solvent containing a surfactant, wherein one or two or more phosphorous-containing functional groups, containing at least one P—O or P=O bond, are bounded to a resin forming the resin emulsion. The ink composition of the present invention is an ink composition comprising an aqueous solvent, the ink composition being primarily used in a piezo system inkjet recording device, wherein the solvent is mainly water.

The pigment, resin emulsion, surfactant, and aqueous solvent which are major components of the ink composition will be explained.

(1) Resin Emulsion

The resin emulsion in this aspect means an aqueous dispersion solution in which the continuous phase is water and the dispersed particles are resin microparticles. The above resin emulsion generally has such a nature that it is thickened and coagulated when water which is the continuous phase is reduced by evaporation or penetration, and has the effect of restraining the penetration of the pigment into a printing paper to promote the fixation of the pigment to the paper. When one or two or more phosphorous-containing functional groups containing at least one P—O or P=O bond are bound to the resin forming the resin emulsion, the resin emulsion is reacted with calcium in the printing paper to more restrain the penetration of the pigment into the printing paper, thereby exhibiting the effect of preventing bleeding.

The resin emulsion may be produced, for example, by blending water, a monomer, an emulsifier, and a polymerization initiator to undergo emulsion-polymerization reaction, followed by neutralizing. As the emulsifier, a usual polymer-type surfactant may be used or a reactive emulsifier having an unsaturated bond may be used. It is considered that since a phosphorous-containing functional group having a P—O or P=O bond is contained in the monomer and reactive emulsifier, the phosphorous-containing functional group is directly bound to a resin in the resin emulsion, directly causing a reaction between the resin and calcium contained in the printing paper, which more improves a bleed preventive effect. Also, the polymerization reaction may be run in the absence of the emulsifier as the case may be. The resin emulsion may also be obtained by blending resin microparticles with water together with a surfactant, without running an emulsion polymerization reaction. For example, the resin emulsion may be obtained by adding and mixing resin microparticles constituted of a (meth)acrylic ester to which one or two or more phosphorous-containing functional group having at least one P—O or P=O bond is bound, or of styrene and the (meth)acrylic ester together with a surfactant in water. In this case, the blending ratio (ratio by weight) of the resin component to the surfactant is usually preferably about 10:1 to 5:1. When the ratio of the surfactant to be used is less than the above range, an emulsion is scarcely formed, whereas when the ratio is out of the above range, there is a fear as to deteriorations in the water resistance and penetrability of ink, and therefore, not preferable.

Specific examples of the resin component constituting the resin emulsion preferably include a (meth)acryl resin, styrene resin, polyester resin, vinyl resin, vinyl chloride resin, vinyl acetate resin, vinyl type copolymer resin such as a butyral resin, styrene-acryl resin, polyamide resin, polyethylene resin, urethane resin, urethane-acryl resin, cellulose resin, silicone resin, silicone-acryl resin, rosin resin, acrylamide resin, epoxy resin and mixtures of these resins. Particularly, the resin microparticles preferably contain a (meth)acryl resin. No particular limitation is imposed on the form of copolymer, and the copolymer may be, for example, any of a block copolymer, random copolymer, and the like.

As these resin components, polymers having both a hydrophilic part and a hydrophobic part are preferable, and the average particle diameter is preferably 500 nm or less and more preferably 100 nm or less though no particular limitation is imposed on the average particle diameter as long as an emulsion can be formed. If the particle diameter of the resin component constituting the resin emulsion is larger than 500 nm, so that the difference in particle diameter between the resin component and the pigment dispersion increases, if the resin, i.e., resin particles formed from emulsion particles are brought into contact with each other so that pigment particles exist in spaces between resin particles when the ink composition is discharged to form dots, resulting in the formation of island structures, there is a fear that the fixability of the pigment is hindered.

<a> Emulsifier, Polymerization Initiator

The same types as those described in the above section "1. Aspect A" may be used as the emulsifier and polymerization initiator. Therefore, explanations of these emulsifier and polymerization initiator are omitted.

<b> Monomer Component

<1> Monomer

An unsaturated vinyl monomer is preferably used as the monomer to be used in the aforementioned emulsion polymerization. Specific examples of the unsaturated vinyl monomer include acrylic ester monomers, methacrylic ester monomers, aromatic vinyl monomers, vinyl ester monomers, vinylcyan compound monomers, halogenated monomers, olefin monomers, and diene monomers which are usually used in emulsion polymerization.

Specific examples include acrylates such as methylacrylic esters, ethylacrylate, isopropylacrylate, n-butylacrylate, and isobutylacrylate; methacrylic esters such as methylmethacrylate, ethylmethacrylate, isopropylmethacrylate, and n-butylmethacrylate; vinyl esters such as vinyl acetate; vinylcyan compounds such as acrylonitrile and methacrylonitrile; halogenated monomers such as vinylidene chloride and vinyl chloride; aromatic vinyl monomers such as styrene, 2-methylstyrene, vinyltoluene, t-butylstyrene, and chlorostyrene; olefins such as ethylene, propylene, and isopropylene; dienes such as butadiene and chloroprene; and vinyl monomers such as vinyl ether, vinyl ketone, and vinyl pyrrolidone. It is essential to utilize an unsaturated vinyl monomer having a carboxyl group for monomers having no carboxyl group. Preferable examples include acrylic acid, methacrylic acid, itaconic acid, fumaric acid, and maleic acid and it is more preferable to use methacrylic acids.

<2> Crosslinking Monomer

The resin microparticles forming the resin emulsion can be designed to have a structure crosslinked by a crosslinking monomer having two or more polymerizable double bonds. Examples of the crosslinking monomer having two or more polymerizable double bonds include diacrylate compounds such as polyethylene glycol diacrylate, triethylene glycol diacrylate, and 1,3-butylene glycol diacrylate; triacrylate compounds such as trimethylolpropanetriacrylate, trimethylolethanetriacrylate, and tetramethylolmethanetriacrylate; dimethacrylate compounds such as ethylene glycol dimethacrylate, diethylene glycol dimethacrylate, and triethylene glycol dimethacrylate; trimethacrylate compounds such as trimethylolpropane trimethacrylate and trimethylolethane trimethacrylate; and divinylbenzene.

Printing stability can be more improved by adding acrylamides or a hydroxyl group-containing monomer in addition to the above monomer. Specific examples of the acrylamides include acrylamide and N,N-dimethylacrylamide. Specific examples of the hydroxyl group-containing monomer include 2-hydroxyethylacrylate, 2-hydroxypropylacrylate, and 2-hydroxyethylmethacrylate. These compounds may be used either singly or in combinations of two or more.

<3> Phosphorous-Containing Functional Group

The phosphorous-containing group to be bound to a resin of the resin emulsion to improve the fixability of the pigment by utilizing the reactivity with calcium ions contained in printing paper may be designed to be the same as the functional group described in the above section "1. Aspect A", and therefore, the explanations of the phosphorous-containing group are omitted here.

The introduction of the above phosphorous-containing functional group into a resin of the resin emulsion may be accomplished either by a method in which a monomer containing a phosphorous-containing functional group is used in a certain ratio in a monomer component in the production of the resin emulsion by polymerization to thereby introduce the functional group in a resin of the resin emulsion or by a known method in which a compound containing a phosphorous-containing functional group is added to a resin in the resin emulsion.

<4> Other Phosphorous-Containing Functional Groups

A reactive surfactant containing phosphorous may be used as the monomer containing a phosphorous-containing functional group.

As a phosphate type reactive surfactant having a P=O bond, ADEKA REASOAP PP-70, SDX-334, SDX-731, and the like manufactured by ADEKA Corporation and H-3330PL and the like manufactured by Dai-ichi Kogyo Seiyaku Co., Ltd. are commercially available.

Here, the molecular formula of ADEKA REASOAP PP-70 is $[CH_2\!=\!CHCH_2O(CH_2C(CH_3)HO)_m]_LP(\!=\!O)\!-\!(OH)_{3-L}$ (L: 1 or 2).

Also, as the monomer containing a phosphorous-containing functional group having at least one P—O or P=O bond and a polymerizable double bond, $CH_2\!=\!CH\text{-}\phi\text{-}P(O)(OH)_2$, $CH_2\!=\!CH\text{-}\phi\text{-}OP(O)(OR)_2$, $CH_2\!=\!CH\text{-}\phi\text{-}OP(S)(OR)_2$, and $CH_2\!=\!CH\text{-}\phi\text{-}OP(O)ClR$ (in the above formula, $\phi$ represents a benzene ring, and R represents an alkyl group having 1 to 6 carbon atoms) may be exemplified, and further, monomers disclosed in Jpn. Pat. Appln. Publication Nos. 2000-178478; 2000-314030; and Hei3-095209 may be used.

<5> Calcium Index of a Phosphorus-Containing Functional Group

If one or two or more phosphorous-containing functional groups having at least one P—O or P=O bond are bound to a principal chain or side chain of resin microparticles forming the resin emulsion, the effect, of restraining penetration of a pigment into a printing paper to thereby limit bleeding, will be exhibited, as mentioned above. In this case, the phosphorous-containing functional group preferably has a larger calcium index than a calcium index of 1,2,3-benzenetricarboxylic acid. Here, the calcium index and its measuring method are the same as the contents described in the section "1. Aspect A" and therefore, the explanations of them are omitted here.

Patent Literature 1 describes that when an ink composition containing a pigment component obtained by binding a phosphorous-containing functional group as mentioned above, is printed on a printing paper, the phosphorous-containing functional group is interacted with or bound to a calcium salt or other divalent metal salt present in the printing paper or surface thereof, with the result that the pigment is easily fixed to the paper.

<c> Neutralizer

A neutralizer used after the emulsion polymerization reaction and the degree of neutralization may be designed to be the same as those described in the above section "1. Aspect A". Therefore, the explanations of them are omitted here.

<d> Resin Emulsion

The molecular weight of the resin emulsion is preferably 1,000 or more and more preferably about 1,000 to 200,000. Though no particular limitation is imposed on the content of the resin emulsion in the ink composition, the solid content of the resin emulsion may be designed to be, for example, about 0.05 to 20 mass % based on the total amount of the ink composition. In this case, the sum of the solid contents of the pigment of the pigment dispersion and the resin emulsion is preferably in a range of 0.1 to 30 mass % based on the total amount of the ink composition as mentioned above.

<e> Conductance of the Resin Emulsion

It is considered that when a surface-treated pigment which will be explained later is used as the pigment in the ink composition of this aspect, the reactivity between the resin emulsion and the surface-treated pigment can be reduced because the conductance of the aqueous solution containing 1 mass % of a solid content of the resin emulsion is low.

The conductance of the aqueous solution containing 1 mass % of a solid content of the resin emulsion is preferably 300 µS/cm or less, more preferably 200 µS/cm or less and even more preferably 150 µS/cm or less. The reason why this conductance range is preferable is the same as that explained in the above section "1. Aspect A" and therefore, the explanations of the reason are omitted here.

(2) Pigment

If ink compositions are classified by the colorant to be used, it is classified into a dye ink and a pigment ink. The pigment ink is superior to a dye ink in image preserving characteristics such as light resistance, water resistance, and gas resistance and the utilization in the inkjet recording is under progress. A pigment ink is used in this aspect.

A pigment exists as particles in ink and basically develops a color through a crystal structure.

As a method of dispersing a pigment in the ink composition, there are two types, that is, a resin dispersion type and self dispersion type. The resin dispersion type is a method in which a pigment is dispersed by a polymer dispersant (surfactant). The polymer dispersant can more stably disperse a pigment than a low-molecular weight surfactant because a steric repulsion effect works besides electrostatic repulsion among particles caused by charges. The self dispersion type is one which disperses by directly modifying the surface of the pigment with a hydrophilic group, and this can be done by surface treatments in which at least one functional group selected from a carbonyl group, carboxyl group, hydroxyl group, and sulfone group or salt thereof is bound as the hydrophilic group.

The average primary particle diameter (D50) of the pigment may be designed to be, for example, in a range of 5 nm to 200 nm and preferably in a range of 30 nm to 150 nm. This is because irregular reflection of pigment particles in a print image portion can be prevented and also, a print image having a uniform density can be provided when the particle diameter of the pigment is designed to be a specified particle diameter or less. When the average primary particle diameter of the pigment exceeds 200 nm, irregular reflection of pigment particles in a print image portion is caused, bringing about deteriorated image chroma and uneven density. The reason is based on that when the average particle diameter is within the above range, the effect of preventing the irregular reflection of pigment particles in the print image portion is improved. The average primary particle diameter of the pigment in this aspect is a value measured at 23° C. under 55% RH by a grain size analyzer (Model: Microtrack UPA, manufactured by Nikkiso Co., Ltd.). As the pigment, an organic pigment may be used. Also, carbon black which is an inorganic pigment is also used. As the color of the pigment, any of blue, black, brown, cyan, green, white, violet, magenta, red, orange, and yellow may be adopted. A mixture of pigments having different colors may be used.

In the pigment dispersion of the present aspect, among the above surface-treated pigments, pigments are preferably obtained by binding a functional group, having a larger calcium index than a calcium index of 1,2,3-benzenetricarboxylic acid, to the surface thereof. Each composition of the surface-treated pigment will be explained.

In this aspect, when the aforementioned modified resin obtained by binding one or two or more phosphorous-containing functional groups, having at least one P—O or P=O bond, to a resin forming the resin emulsion is combined and used with the surface-treated pigment obtained by binding one or two or more functional groups, having a larger calcium index than a calcium index of 1,2,3-benzenetricarboxylic acid, to the surface of a pigment, an ink composition wherein bleeding is further inhibited so that fixability to paper is improved, making possible to print a more clear image, can be obtained.

A phosphorous-containing functional group containing at least one P—O or P=O bond can be used as the functional group having a larger calcium index than a calcium index of 1,2,3-benzenetricarboxylic acid on the surface of the pigment. The phosphorous-containing functional group in this case is the same as that of the phosphorous-containing functional group described in the section "Resin emulsion".

A method of producing the surface-treated pigment obtained by binding a phosphorous-containing functional group, containing at least one P—O or P=O bond, to the surface thereof, for example, the methods described in Patent Literature 1 presenting such a report that these methods are disclosed in the specifications of U.S. Pat. Nos. 5,554,739; 5,707,432; and 5,837,045 may be adopted like those described in the section "1. Aspect A". The form of the surface-treated pigment may be the same as that described in the section "1. Aspect A".

The pigment dispersion may be refined by a cleaning process such as filtration, centrifugation, or a combination of these two methods to remove unreacted raw materials, by-produced salts and other reaction impurities. The products may be isolated by, for example, vaporization or may be recovered by filtration and drying.

No particular limitation is imposed on the content of the pigment dispersion as long as a sufficient image density can be attained. Specifically, the content of the pigment of the pigment dispersion is preferably in a range of 0.05 to 20 mass % based on the total amount of the ink composition. At this time, the sum of the solid contents of the pigment of the pigment dispersion and resin emulsion is preferably in a range of 0.1 to 30 mass % based on the total amount of the ink composition.

(3) Surfactant

The ink composition of this aspect generally contains a surfactant. Although no particular limitation imposed on the surfactant, it may be the same as that described in the section "1. Aspect A". Also, the content of the surfactant may be the same as that described in the section "1. Aspect A".

(4) Additives

The ink composition of this aspect may contain other optional components besides the above components. For example, a penetrant, wetting agent, antiseptic, antioxidant, conductivity regulator, pH regulator, viscosity regulator, surface tension regulator, antifoaming agent, and oxygen scavenger may be added to the ink composition of this aspect.

<a> Penetrant

According to a preferred embodiment of this aspect, the ink composition preferably contains a penetrant. Though some types of below-mentioned water-soluble organic solvents are able to function as a penetrant, preferable examples of the penetrant in this aspect include 1,2-alkyldiol, glycol ether, acetylene glycol type surfactants, and acetylene alcohol type surfactants, and these may be used either singly or in combinations of two or more. Specific examples of the 1,2-alkyldiol include 1,2-hexanediol or 1,2-pentanediol. Specific examples of the glycol ether include diethylene glycol monobutyl ether, diethylene glycol monopentyl ether, and diethylene glycol monohexyl ether. The amount of 1,2-alkylene glycol or glycol ether to be added is preferably 1 to 15 weight % and more preferably 1 to 10 weight % based on the total weight of the ink composition.

<b> Wetting Agent

According to a preferred embodiment of this aspect, the ink preferably further contains a wetting agent. As the wetting agent, one comprising a water-soluble organic solvent having a boiling point of 180° C. or more, water absorbing ability and water retentivity is preferably used. A preferable wetting agent is glycerin, diethylene glycol, or triethylene glycol. In this aspect, glycerin, and diethylene glycol are preferable in particular. The amount of the wetting agent to be added is preferably in a range of 5 to 30 weight % and more preferably 5 to 20 weight % based on the total weight of the ink jet recording ink composition. In this aspect, a tertiary amine may be utilized as the wetting agent. Examples of the tertiary amine include trimethylamine, triethylamine, and triethanolamine. These may be used either singly or in combinations of two or more. The amount of the tertiary amine to be added is preferably in a range of about 0.3 to 15 weight % and more preferably about 0.5 to 10 weight % based on the total amount of the ink composition.

<c> Dispersion Stability and Quick-Drying Improver

The dispersion stability and quick-drying ability are improved when 3-methoxy-3-methyl-1-butanol is contained in the ink composition. When the amount of a glycol ether type penetrant to be added, in the ink composition containing pigment, is large, there is the case where the dispersion stability of the pigment is deteriorated with time, giving rise to a problem concerning discharging ability. 3-methoxy-3-methyl-1-butanol is accompanied by none of the problems of conventional penetrants, but remarkably improves the dispersion stability of the pigment with time, and can inhibit the increase in grain size and the increase in ink viscosity. It is estimated that these effects are caused by a hydrophobic group contained in 3-methoxy-3-methyl-1-butanol. This reason is considered as follows. Specifically, the hydrophobic groups contained in 3-methoxy-3-methyl-1-butanol are a methyl group and methoxy group, which each have a relatively small hydrophobicity. In the dispersion system constituted of a pigment, dispersant and water, the adsorption of 3-methoxy-3-methyl-1-butanol to the hydrophobic surface of the pigment is reduced and therefore, the adhesion of the pigment and the dispersant is not prevented. For this, as a result, the dispersion system constituted of a pigment, dispersant and water is stabilized. When 3-methoxy-3-methyl-1-butanol is contained in an amount of 0.5 to 20 weight % in the ink composition of this aspect, the dispersion stability of the pigment and quick-drying ability are improved without any disadvantage, a high-quality image can be formed on plain paper, and no clogging is caused even in the case of intermittent discharge because 30 weight % or more of the water-soluble organic solvent is formulated.

(5) Solvent

In the ink composition of this aspect, a water-soluble organic solvent, water, or a mixture of these solvents is used as the aqueous solvent. As the water-soluble organic solvent, the same solvent as that described in the above section "1. Aspect A" may be used. Also, as the water, not general water containing various ions but deionized water is preferably used. When the ink composition contains water, the content of water may be, though not particularly limited to, for example, about 20 to 80 mass % and preferably in a range of 30 to 50 mass % based on the total amount of the ink composition. Also, the content of the water-soluble organic solvent is preferably, for example, in a range of 10 mass % to 70 mass % and more preferably in a range of 20 mass % to 50 mass % based on the total amount of the ink composition.

(6) Use

The use of the ink composition of this aspect is the same as that described in the section "1. Aspect A".

(7) Others

The viscosity, surface tension, and pH of the ink composition in this aspect may be the same as those described in the section "1. Aspect A".

B. Recorded Products

Next, recorded products of the present invention will be described.

The recorded products of the present invention are characterized in that they are provided with an image printed on paper by using the above ink composition.

According to this invention, the above ink composition is used to print, and therefore, a clear image free from ink bleeding can be obtained irrespective of the type of paper.

No particular limitation is imposed on the paper used in the present invention and the paper is preferably paper such as high-quality paper containing a calcium salt as a filler. Also, the above paper is preferably that used as printing paper.

Also, specific examples of the recorded products of the present invention may include print products.

C. Recording Method

Next, the recording method of the present invention will be explained.

The recording method in the present invention is characterized in that the above ink composition is used to form an image on a recording medium.

According to the present invention, the above ink composition is used to form images. Therefore, a clear image free from ink bleeding can be obtained irrespective of the type of recording medium.

The present invention is not limited to the aforementioned embodiments. These embodiments are examples and whatever having substantially the same configuration and produces the same action effect as the technical spirit described in the claim of the present invention is embraced within the technical scope of the present invention.

EXAMPLES

The present invention will be explained in detail by way of examples.

Examples 1-1 to 1-2

Production Examples

Preparation of Pigment Dispersions 1 to 4

The same procedures as those described in Kieczykowski at al., J. Org. Chem., 1995, 60, 8310 to 8312 and description of U.S. Pat. No. 4,922,007 were used to produce a [2-(4-aminophenyl)-1-hydroxyethane-1,1-diyl]bisphosphonic acid-sodium salt. First, a 500 mL three-neck flask was equipped with a condenser provided with a gas outlet at the top thereof, a thermometer, a dry nitrogen introduction port, and a 100 mL equalizing dropping funnel. First, 32 g of phosphorous acid (380 mmol) and 160 mL of methanesulfonic acid (solvent) were added to this flask. 57.4 g of aminophenylacetic acid (380 mmol) was added little by little to the stirred mixture. The stirred mixture was heated at 65° C. for 1 to 2 hours to dissolve the solid completely. The whole system was flushed with dry nitrogen and the temperature of the system was dropped to 40° C. after the solid was completely dissolved. 70 mL of $PCl_3$ (800 mmol) was gradually added to the heated solution through the dropping funnel. HCl gas was generated from the reaction. This gas flowed through the gas outlet to a dry tube and then through a funnel to a concentrated NaOH solution in a beaker. After the addition was completed, the reaction mixture was stirred for 2 hours and concurrently heated at 40° C. After that, the temperature of the system was heated to 65 to 70° C. and the mixture was stirred overnight. The produced supernatant brown solution was cooled to ambient temperature and quenched by addition into the solution to 600 g of an ice/water mixture. This aqueous mixture was poured into a 1 L beaker and heated at 90 to 95° C. for 4 hours (the top of the beaker was covered with a glass plate). Then, this mixture was cooled to ambient temperature and pH of this mixture was adjusted to 4 to 5 by a 50% NaOH solution (the NaOH solution was slowly added because the temperature raises as a result of the quenching). This mixture was cooled to 5° C. in an ice bath for 2 hours, and then, the resulted solid was collected by suction filtration. The collected solid was washed with 1 L of cooled deionized water and dried at 60° C. overnight to obtain a white or off-white solid product (yield: 48 g, 39%). $^1$H-NMR data ($D_2O$/NaOH) of this compound was as follows: 7.3 (2H, d), 6.76 (2H, d), and 3.2 (2H, t). $^{13}$C-NMR data ($D_2O$/NaOH) of this compound was as follows: 141, 130, 128, 112, and 73.

With regard to the above compound, a pigment was modified by the following general procedures. Black Pearls (registered trademark) 700 Carbon Black (manufactured by Cabot Corporation) was used as carbon black, Pigment Yellow 74 (manufactured by Sun Chemical Corporation) was used as a yellow pigment, Pigment Red 122 (manufactured by Sun Chemical Corporation) was used as a red pigment, and Pigment Blue 15:4 (manufactured by Sun Chemical Corporation) was used as a blue pigment.

20 g of a pigment, 20 mmol of the material produced above, 20 mmol of nitric acid, and 200 mL of deionized water were blended by a Silverson Mixer (6000 rpm) at ambient temperature. After 30 minutes, sodium nitrite (20 mmol) dissolved in a small amount of water was slowly added to this mixture. The temperature reached 60° C. by mixing to allow the reaction to proceed one hour. A surface-treated pigment was produced by the above process. Then, the pigment was adjusted to pH 10 by a NaOH solution. After 30 minutes, the dispersion solution in which the surface-treated pigment (including pigments obtained by binding at least two phosphonic acid groups or salt thereof) was produced was subjected to diafiltration carried out by using 20 parts by volume of deionized water by a spectrum membrane to concentrate the solution into about 12% solid content solution. After sonic wave treatment using a sonic wave probe for 30 minutes, the average volume grain size (mV) of the surface-treated pigment in the dispersion solution was determined.

Example 1-1

Each component such as a pigment dispersion and a resin emulsion were blended and stirred at 25° C. such that the following composition was obtained, to thereby prepare an ink composition.

<Composition 1 of an Ink Composition>

| Pigment dispersion | 6 mass % (pigment content) |
|---|---|
| Resin emulsion | 6 mass % (solid content) |
| Water | Balance |

<Composition 2 of an Ink Composition>

| Pigment dispersion | 8 mass % (pigment content) |
|---|---|
| Resin emulsion | 4 mass % (solid content) |
| Water | Balance |

<Composition 3 of an Ink Composition>

| Pigment dispersion | 4 mass % (pigment content) |
|---|---|
| Resin emulsion | 8 mass % (solid content) |
| Water | Balance |

<Composition 4 of an Ink Composition>

| | |
|---|---|
| Pigment dispersion | 10 mass % (pigment content) |
| Resin emulsion | 2 mass % (solid content) |
| Water | Balance |

Table 3 shows pigment dispersions 1 to 6. A Cab-O-Jet200 (manufactured by Cabot Corporation) was used as the pigment dispersion 5 and a Cab-O-Jet300 (manufactured by Cabot Corporation) was used as the pigment dispersion 6. In Table 3, the calcium indices are those obtained by referring to the above Table 1. Also, the conductance A of the aqueous solution containing 1 mass % pigment of the pigment dispersion was measured by the aforementioned method. The pH of the pigment dispersion was measured by WP pH Scan BNC manufactured by Eutech Instruments Pte Ltd. at 25° C.

Also, as the resin emulsion, those shown in Table 4 was used. In Table 4, the conductance B of an aqueous solution containing 1 mass % of a solid content of the resin emulsion was measured by the aforementioned method. The pH of the resin emulsion was measured by WP pH Scan BNC manufactured by Eutech Instruments Pte Ltd. at 25° C. Also, in Table 4, Tg is a glass transition temperature and MFT is the lowest filming temperature.

TABLE 3

| | | Concentration of pigment | Functional group | | | Conductance A |
|---|---|---|---|---|---|---|
| | Pigment | (mass %) | Compound | Calcium index | pH | (μS/cm) |
| Pigment dispersion 1 | Carbon black | 15 | Phosphonic acid | 3.45 | 9.0 | 120 |
| Pigment dispersion 2 | PY 74 | 15 | Phosphonic acid | 3.45 | 9.9 | 67 |
| Pigment dispersion 3 | PR 122 | 15 | Phosphonic acid | 3.45 | 9.8 | 121 |
| Pigment dispersion 4 | PB 15:4 | 15 | Phosphonic acid | 3.45 | 9.9 | 96 |
| Pigment dispersion 5 | Carbon black | 20 | Sulfonic acid | 0.78 | 8.3 | 325 |
| Pigment dispersion 6 | Carbon black | 15 | Carboxylic acid | 1.27 | 8.0 | 54 |

TABLE 4

| | Product | Tg (° C.) | MFT (° C.) | pH | Conductance B (μS/cm) |
|---|---|---|---|---|---|
| Resin emulsion 1 | VONCOAT SA6360 (DIC) | 21 | 29 | 9.0 | 134 |
| Resin emulsion 2 | VONCOAT CG-8520 (DIC) | 18 | 21 | 8.8 | 152 |
| Resin emulsion 3 | VONCOAT EC-740EF (DIC) | 18 | 18 | 8.0 | 147 |
| Resin emulsion 4 | JONCRYL HRC-1645J (BASF) | 21 | 9 | 8.1 | 293 |
| Resin emulsion 5 | JONCRYL 537J (BASF) | 49 | 42 | 8.8 | 515 |
| Resin emulsion 6 | JONCRYL 7610 (BASF) | 96 | 50< | 8.3 | 594 |
| Resin emulsion 7 | JONCRYL 775 (BASF) | 37 | 15 | 8.3 | 665 |
| Resin emulsion 8 | JONCRYL 7001 (BASF) | 12 | <5 | 8.4 | 1099 |

Each ink composition was poured into a glass bottle, which was stored at 50° C. for one week to examine whether precipitates were formed or not after the composition was stored to evaluate the mixing stability according to the following standard. The results are shown in Table 5.

<Evaluation Standard>

TABLE 5

| | Pigment dispersion | | Resin emulsion | | | Ink composition (mass %) | | |
|---|---|---|---|---|---|---|---|---|
| Test No. | Type | Conductance A (μS/cm) | Type | Conductance B (μS/cm) | A × B (×10$^4$) | Pigment (Pigment dispersion) | Solid content (Resin emulsion) | Mixing stability |
| 1 | Pigment dispersion 1 | 120 | Resin emulsion 1 | 134 | 1.6 | 6 | 6 | ○ |
| 2 | | | Resin emulsion 2 | 152 | 1.8 | | | ○ |
| 3 | | | Resin emulsion 3 | 147 | 1.8 | | | ○ |
| 4 | | | Resin emulsion 4 | 293 | 3.5 | | | Δ |
| 5 | | | Resin emulsion 5 | 515 | 6.2 | | | X |
| 6 | | | Resin emulsion 6 | 594 | 7.1 | | | X |
| 7 | | | Resin emulsion 7 | 665 | 8.0 | | | X |
| 8 | | | Resin emulsion 8 | 1099 | 13.2 | | | X |
| 9 | Pigment dispersion 2 | 67 | Resin emulsion 1 | 134 | 0.9 | 6 | 6 | ○ |
| 10 | | | Resin emulsion 2 | 152 | 1.0 | | | ○ |
| 11 | | | Resin emulsion 3 | 147 | 1.0 | | | ○ |
| 12 | | | Resin emulsion 4 | 293 | 2.0 | | | ○ |
| 13 | | | Resin emulsion 5 | 515 | 3.5 | | | Δ |
| 14 | | | Resin emulsion 6 | 594 | 4.0 | | | Δ |
| 15 | | | Resin emulsion 7 | 665 | 4.5 | | | X |
| 16 | | | Resin emulsion 8 | 1099 | 7.4 | | | X |
| 17 | Pigment dispersion 3 | 121 | Resin emulsion 1 | 134 | 1.6 | 6 | 6 | ○ |
| 18 | | | Resin emulsion 2 | 152 | 1.8 | | | ○ |
| 19 | | | Resin emulsion 3 | 147 | 1.8 | | | ○ |
| 20 | | | Resin emulsion 4 | 293 | 3.5 | | | ○ |
| 21 | | | Resin emulsion 5 | 515 | 6.2 | | | X |
| 22 | | | Resin emulsion 6 | 594 | 7.2 | | | X |
| 23 | | | Resin emulsion 7 | 665 | 8.0 | | | X |
| 24 | | | Resin emulsion 8 | 1099 | 13.3 | | | X |
| 25 | Pigment dispersion 4 | 96 | Resin emulsion 1 | 134 | 1.3 | 6 | 6 | ○ |
| 26 | | | Resin emulsion 2 | 152 | 1.4 | | | ○ |

TABLE 5-continued

| | Pigment dispersion | | Resin emulsion | | | Ink composition (mass %) | | |
|---|---|---|---|---|---|---|---|---|
| Test No. | Type | Conductance A (µS/cm) | Type | Conductance B (µS/cm) | A × B(×10$^4$) | Pigment (Pigment dispersion) | Solid content (Resin emulsion) | Mixing stability |
| 27 | | | Resin emulsion 3 | 147 | 1.4 | | | ○ |
| 28 | | | Resin emulsion 4 | 293 | 2.8 | | | ○ |
| 29 | | | Resin emulsion 5 | 515 | 4.9 | | | X |
| 30 | | | Resin emulsion 6 | 594 | 5.7 | | | X |
| 31 | | | Resin emulsion 7 | 665 | 6.4 | | | X |
| 32 | | | Resin emulsion 8 | 1099 | 10.6 | | | X |
| 33 | Pigment dispersion 5 | 325 | Resin emulsion 1 | 134 | 4.4 | 6 | 6 | ○ |
| 34 | | | Resin emulsion 4 | 293 | 9.5 | | | ○ |
| 35 | | | Resin emulsion 6 | 594 | 19.3 | | | X |
| 36 | | | Resin emulsion 8 | 1099 | 35.7 | | | X |
| 37 | Pigment dispersion 6 | 54 | Resin emulsion 1 | 134 | 0.7 | 6 | 6 | ○ |
| 38 | | | Resin emulsion 4 | 293 | 1.6 | | | ○ |
| 39 | | | Resin emulsion 6 | 594 | 3.2 | | | X |
| 40 | | | Resin emulsion 8 | 1099 | 5.9 | | | X |
| 41 | Pigment dispersion 1 | 120 | Resin emulsion 1 | 134 | 1.6 | 8 | 4 | ○ |
| 42 | | | Resin emulsion 1 | 134 | 1.6 | 4 | 8 | ○ |
| 43 | | | Resin emulsion 7 | 665 | 8.0 | 8 | 4 | X |
| 44 | | | Resin emulsion 8 | 1099 | 13.2 | 10 | 2 | X |
| 45 | | | Resin emulsion 8 | 1099 | 13.2 | 4 | 8 | X |

○: No coagulate is precipitated.
Δ: Though coagulated is slightly produced, this has no influence on fluidity.
X: Coagulate is precipitated and fluidity is deteriorated.

In the inks using the resin emulsions 1 to 4 (test Nos: 1 to 4, 9 to 12, 17 to 20, and 25 to 28) among the inks using the pigment dispersions 1 to 4 (test No: 1 to 32), the calcium index of a functional group of the surface-treated pigment was large, and also the conductance B of the aqueous solution containing 1 mass % of a solid content of the resin emulsion was 300 µS/cm or less. Each ink thus showed good mixing stability. It was found that in the case where the functional group of the surface-treated pigment had a large calcium index, by setting the conductance B of the aqueous solution containing 1 mass % of a solid content of the resin emulsion to 300 µS/cm or less, inks which were scarcely coagulated and were stable could be produced.

Also, in the inks having the value of A×B less than 4.0×10$^4$ (test Nos: 1 to 4, 9 to 14, 17 to 20, and 25 to 28) among the inks using the pigment dispersions 1 to 4 (test No: 1 to 32), good mixing stability was obtained. It was found that in the case where the functional group of the surface-treated pigment had a large calcium index, by setting the A×B value to less than 4.0×10$^4$, inks which were scarcely coagulated and were stable could be produced.

Also, in the inks of test Nos: 41 to 45, when the A×B value exceeded 4.0×10$^4$, the coagulation was caused and thereby the mixing stability was poor regardless of the ratio of the pigment to the resin emulsion even if the ratio was varied, whereas when the A×B value was less than 4.0×10$^4$, the coagulation was scarcely caused and thereby the mixing stability was good. It was found that by setting the A×B value to less than 4.0×10$^4$, independently of the ratio of the pigment to the resin emulsion, inks which were scarcely coagulated and were stable could be produced.

In the inks using the pigment dispersions 5 and 6 (test No: 33 to 40) in which the calcium index of the functional group of the surface-treated-pigment was small, on the other hand, it was difficult to find out the correlation between coagulation and A×B value.

Example 1-2

Each component such as a pigment dispersion and a resin emulsion were blended and stirred at 25° C. such that the following composition was obtained, to thereby prepare an ink composition. As the pigment dispersion and the resin emulsion, those shown in Tables 3 and 4 were used.

<Composition of an Ink Composition 1>

| | |
|---|---|
| Pigment dispersion | 6 mass % (pigment content) |
| Resin emulsion | 6 mass % (solid content) |
| Glycerin | 18 mass % |
| Diethylene glycol | 10 mass % |
| Trimethylol propane | 5 mass % |
| 1,2-hexanediol | 4 mass % |
| Surfynol 465 (manufactured by Air Products Japan, Inc.) | 1 mass % |
| Water | Balance |

<Composition of an Ink Composition 2>

| | |
|---|---|
| Pigment dispersion | 6 mass % (pigment content) |
| Resin emulsion | 6 mass % (solid content) |
| Glycerin | 15 mass % |
| Diethylene glycol | 15 mass % |
| Surfynol 465 (manufactured by Air Products Japan, Inc.) | 1 mass % |
| Water | Balance |

First, each ink composition was used to print at normal temperature (25° C.) by using an ink jet coater (trade name: DMP-2831, manufactured by FUJI FILM Dimatix, Inc.) in the following conditions: 1 dot width, dot pitch of 40 µm, piezo voltage of 20 V, and drive frequency of 5 kHz. As the paper, regenerated paper (regenerated PPC-W; Daio Paper Corp.), high-quality paper (New NPi High-quality; Nippon Paper Industries Co., Ltd.), coated paper (OK topcoat; Oji Paper Co., Ltd.), coated paper (POD coat; Oji Paper Co., Ltd.), and carbonless paper (carbonless intermediate paper; Mitsubish Paper Mills Limited) were used.

The concentration (optical density: OD) of the solid part of the print product was measured using a spectral colorimeter (trade name: X-Rite 938; manufactured by X-Rite Incorporated).

Next, each ink composition was evaluated as follows.
(Storage Stability of Ink)

Each ink composition was poured into a polyethylene container, which was then sealed and stored at 60° C. for one week. Then, the particle diameter of the pigment, and the surface tension and viscosity of the ink were measured to evaluate by the rate of change from initial physical properties according to the following standard.

The average particle diameter of the pigment in the ink was measured by a thick-type particle size analyzer (trade name: FPAR-1000; manufactured by Otsuka Electronics Co., Ltd.).

The surface tension of the ink was measured at 25° C. by using an automatic surface tensiometer (trade name: CBVP-Z type; manufactured by Kyowa Interface Scientific Co., Ltd.) according to the plate method using a platinum plate.

The viscosity of the ink was measured using a viscometer (trade name: AMVn; manufactured by Anton Paar Co. Ltd.) at 25° C.

<Evaluation Standard>
○: Change ratio was less than 10% in all of particle diameter, surface tension, and viscosity.
x: Change ratio was 10% or more in at least one of particle diameter, surface tension, or viscosity.

(Discharge Reliability of Ink)
The charge condition of ejection of ink was observed with a high-speed camera to evaluate according to the following standard.
<Evaluation Standard>
○: Neither flight bending nor nozzle clogging occurred.
x: Flight bending or nozzle clogging occurred.

(Drying Characteristics)
Drying characteristics were evaluated by finger touching after the sample was allowed to stand at ambient temperature for 5 minutes after printing.

<Evaluation Standard>
○: Ink was not stuck to a finger.
x: Ink was stuck to a finger.

(Abrasion Resistance of Print Products)
After each obtained print product sample was dried, its abrasion resistance was evaluated by the following standard.
<Evaluation Standard>
○: Color loss was not caused even by rubbing with a dry cotton cloth regardless of the type of paper.
x: Peeled when rubbed with a dry cotton cloth.

(Water Resistance of a Print Product)
Each of the obtained print product samples was dipped in water at 25° C. for 10 minutes to evaluate the condition of elution of ink from the printed portion according to the following standard.
<Evaluation Standard>
○: Neither reduction in density nor bleeding caused by elution of ink was not observed.
Δ: Reduction in density or bleeding caused by elution of ink was slightly observed.
x: Reduction in density or bleeding caused by elution of ink was significant.

Figure 1B:
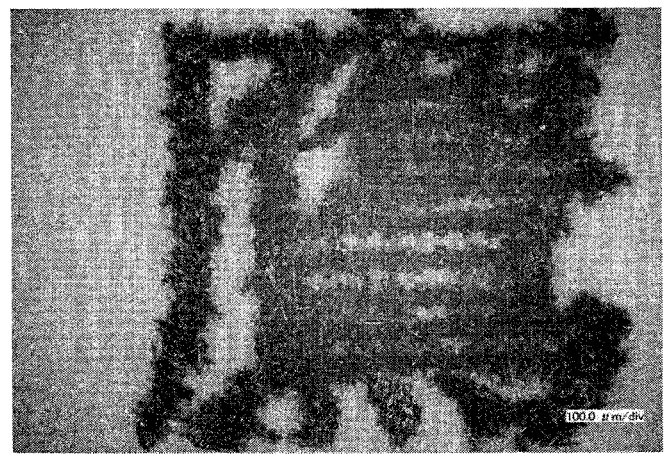

(Image Reproducibility)
A Chinese character meaning "falcon" was printed at 7-point to evaluate bleeding according to the following standard.
<Evaluation Standard>
○: Very clear image without any bleeding. The radical part (lower part of a Chinese character) meaning "bird" was clear. A sample is shown in FIG. 1A.
x: Bleeding is observed and the character has inferior clearness. The character was inferior in the clearness of the radical part (of a Chinese character) meaning "bird". A sample is shown in FIG. 1B.

The results are shown in Table 6. In Table 6, mixing stability was evaluated in the same manner as in Example 1-1.

TABLE 6

|  |  | Test No. | | | | | |
| --- | --- | --- | --- | --- | --- | --- | --- |
|  |  | 1a | 2b | 2a | 7a | 33a | 37a |
|  | Pigment dispersion | Pigment dispersion 1 | Pigment dispersion 1 | Pigment dispersion 1 | Pigment dispersion 1 | Pigment dispersion 5 | Pigment dispersion 6 |
|  | Resin emulsion | Resin emulsion 1 | Resin emulsion 1 | Resin emulsion 2 | Resin emulsion 7 | Resin emulsion 1 | Resin emulsion 1 |
|  | Ink composition | 1 | 2 | 1 | 1 | 1 | 1 |
| Initial stage | Surface tension (mN/m) | 30.9 | 32.2 | 31.1 | 31.2 | 31.0 | 31.2 |
|  | Viscosity (mPa·s) | 6.89 | 4.76 | 6.45 | 8.31 | 6.58 | 6.53 |
|  | Particle diameter (nm) | 129 | 122 | 125 | 125 | 129 | 123 |
|  | pH | 8.6 | 8.6 | 8.4 | 8.6 | 8.3 | 8.0 |
|  | A × B (×10$^4$) | 1.6 | 1.6 | 1.8 | 8.0 | 4.4 | 0.7 |
|  | Ink preservability | ○ | ○ | ○ | X | ○ | ○ |
|  | Mixing stability | ○ | ○ | ○ | X | ○ | ○ |
|  | Discharge reliability | ○ | ○ | ○ | X | ○ | ○ |
|  | Drying characteristics | ○ | ○ | ○ | ○ | ○ | ○ |
| Optical density (OD) | Regenerated PPC-W (Daio Paper Corp.) | 1.14 | 1.15 | 1.12 | 1.12 | 1.05 | 1.04 |
|  | New Npi High-quality (Nippon Paper Industries Ltd.) | 1.08 | 1.10 | 1.07 | 1.07 | 1.04 | 1.03 |
|  | OK topcoat (Oji Paper Co., Ltd.) | 1.74 | 1.76 | 1.62 | 1.58 | 1.58 | 1.53 |
|  | POD coat (Oji Paper Co., Ltd.) | 1.65 | 1.68 | 1.60 | 1.44 | 1.57 | 1.58 |
|  | Carbonless intermediate paper (Mitsubishi Paper Mills Limited) | 1.23 | 1.22 | 1.20 | 1.20 | 1.16 | 1.16 |
|  | Image reproducibility | ○ | ○ | ○ | ○ | X | X |
|  | Abrasion resistance | ○ | ○ | ○ | ○ | Δ | ○ |
|  | Water resistance | ○ | ○ | ○ | ○ | X | Δ |

In the ink of a test No. 7a generated coagulation occurred so that it has inferior discharge reliability and ink preservability because the conductance B of the aqueous solution containing 1 mass % of a solid content of the resin emulsion exceeded 300 μS/cm as shown in Table 5 or the value of A×B exceeded $4.0 \times 10^4$ as shown in Table 5.

In each of the inks using the pigment dispersions 5 and 6 (test Nos.: 33a and 37a), the density of the print product particularly in high-quality paper was low, were inferior in clearness and had insufficient durability because calcium index of the functional group of the surface-treated pigment was small as shown in Table 5.

On the other hand, the inks using the pigment dispersions 1 and 2 (test Nos.: 1a, 2a) were superior in discharge reliability and ink preservability, thereby making possible to obtain a high-density and clear image because they each had a high calcium index of the functional group of the surface-treated pigment was large and the conductance B of the aqueous solution containing 1 mass % of a solid content of the resin emulsion was 300 μS/cm or less, or the value of A×B was less than $4.0 \times 10^4$ as shown in Table 5.

Examples 2-1 to 2-7 and Comparative Examples 1 to 3

(1) Preparation of a Resin Emulsion

Resin emulsions 2-1 to 2-3 were prepared by the following method. The average particle diameter of the obtained resin emulsion was measured using a thick-type particle size analyzer (trade name: FPAR-1000; manufactured by Otsuka Electronics Co., Ltd.).

<a> Preparation of a Resin Emulsion 2-1

The atmosphere in a flask equipped with a mechanical stirrer, a temperature gauge, a nitrogen introduction tube, a reflux tube, and a dropping funnel was sufficiently replaced with nitrogen gas. Then, the flask was charged with 0.75 g of a phosphate type reactive surfactant (trade name: ADEKA REASOAP PP-70, manufactured by ADEKA Corporation), 0.04 g of potassium persulfate, 3 g of acrylic acid, and 150 g of pure water and these were stirred at 25° C. to mix. The mixture of 22.5 g of styrene, 60 g of methylmethacrylate, 30 g of ethylmethacrylate, and 34.5 g of 2-ethylhexylacrylate was added dropwise to the above mixture to prepare a preemulsion. Also, the atmosphere in a flask equipped with a mechanical stirrer, a temperature gauge, a nitrogen introduction tube, a reflux tube, and a dropping funnel was sufficiently replaced with nitrogen gas and then, the flask was charged with 3 g of the aforementioned ADEKA REASOAP PP-70 (manufactured by ADEKA Corporation), 0.01 g of potassium persulfate, and 200 g of pure water, these were stirred at 70° C. to mix. After that, the above prepared preemulsion was added dropwise into the flask over 3 hours. The resulting mixture was further aged at 70° C. under heating for 3 hours, then cooled, and adjusted to pH 8 by adding an aqueous ammonia solution. Then, the resulting mixture was filtered by a #150 mesh filter (manufactured by Nippon Orimono Co., Ltd.) to obtain 500 g of a resin emulsion 2-1 (solid content: 30 mass %). The average particle diameter of the obtained resin was 90 nm.

<b> Preparation of a Resin Emulsion 2-2

The atmosphere in a flask equipped with a mechanical stirrer, a temperature gauge, a nitrogen introduction tube, a reflux tube, and a dropping funnel was sufficiently replaced with nitrogen gas. Then, the flask was charged with 1 g of the aforementioned ADEKA REASOAP PP-70 (manufactured by ADEKA Corporation), 0.04 g of potassium persulfate, 3 g of acrylic acid, and 150 g of pure water and these components were stirred at 25° C. to mix. Next, a mixture of 22.5 g of styrene, 60 g of methylmethacrylate, 30 g of ethylmethacrylate, and 34.5 g of 2-ethylhexylacrylate was added dropwise to prepare a preemulsion.

Also, the atmosphere in a flask equipped with a mechanical stirrer, a temperature gauge, a nitrogen introduction tube, a reflux tube, and a dropping funnel was sufficiently replaced with nitrogen gas and then, the flask was charged with 2.75 g of the aforementioned ADEKA REASOAP PP-70 (manufactured by ADEKA Corporation), 0.01 g of potassium persulfate, and 200 g of pure water. These were stirred at 70° C. to mix. After that, the above prepared preemulsion was added dropwise in the flask over 3 hours. The resulting mixture was further aged at 70° C. under heating for 3 hours, then cooled, and adjusted to pH 8 by adding an aqueous ammonia solution. Then, the resulting mixture was filtered by a #150 mesh filter (manufactured by Nippon Orimono Co., Ltd.) to obtain 500 g of a resin emulsion 2-2 (solid content: 30 mass %). The average particle diameter of the obtained resin was 150 nm.

<c> Preparation of a Resin Emulsion 2-3

A resin emulsion 2-3 (solid content of 30 mass %) was obtained in the same manner as in the case of producing the resin emulsion 2 except that the aforementioned ADEKA REASOAP PP-70 (manufactured by ADEKA Corporation) was altered to LATEMUL PD-104 (trade name, manufactured by Kao Corporation). The average particle diameter of the obtained resin was 150 nm. The prepared resin emulsions 2-1 to 2-3 are shown in Table 7.

TABLE 7

| | Resin component | Amount (mass %) | Average particle diameter (nm) | Functional group | pH | Conductance μS/cm |
|---|---|---|---|---|---|---|
| Resin emulsion 2-1 | Styrene/acryl type copolymer | 30 | 90 | Phosphonic acid group | 8.0 | 134.7 |
| Resin emulsion 2-2 | Styrene/acryl type copolymer | 30 | 150 | Phosphonic acid group | 8.0 | 118.0 |
| Resin emulsion 2-3 | Styrene/acryl type copolymer | 30 | 150 | Phosphonic acid group | 8.0 | 63.1 |

(2) Preparation of a Pigment Dispersion

The pigment dispersions 2-1 to 2-3 used in the examples and comparative examples are described as follows. Also, pigment dispersion 2-1 to 2-3 are shown in Table 8.

<a> Method of Producing a Pigment Dispersion 2-1

The same procedures as those described in Kieczykowski et al., J. Org. Chem., 1995, Vol. 60, pp 8310 to 8312 and in the description of U.S. Pat. No. 4,922,007 were used to produce a [2-(4-aminophenyl)-1-hydroxyethane-1,1-diyl]-bisphosphonic acid-sodium salt. First, a 500 mL three-neck flask was equipped with a condenser provided with a gas outlet at the top thereof, a thermometer, a dry nitrogen introduction port, and a 100 mL equalizing dropping funnel. First, 32 g of phosphorous acid (380 mmol) and 160 mL of methanesulfonic acid (solvent) were added in this flask. 57.4 g of aminophenylacetic acid (380 mmol) was added a little by little to the stirred mixture. The stirred mixture was heated at 65° C. for 1 to 2 hours to dissolve the solid completely. The whole system was flushed with dry nitrogen and the temperature of the system was dropped to 40° C. after the solid was dissolved completely. 70 mL of $PCl_3$ (800 mmol) was gradually added to the heated solution through the dropping funnel. HCl gas was generated from the reaction. This gas flowed through the gas outlet to a dry tube and then through a funnel to a concentrated NaOH solution in a beaker. After the addition was completed, the reaction mixture was stirred for 2 hours while heating to 40° C. After that, the temperature of the system was heated to 65 to 70° C. and the mixture was stirred overnight. The produced supernatant brown solution was cooled to ambient temperature and quenched by addition into the solution to 600 g of an ice/water mixture.

This aqueous mixture was poured into a 1 L beaker and heated at 90 to 95° C. for 4 hours (the top of the beaker was covered with a glass plate). Then, this mixture was cooled to ambient temperature and adjusted to pH 4 to 5 by a 50% NaOH solution (the NaOH solution was slowly added because the temperature raises as a result of the quenching). This mixture was cooled to 5° C. in an ice bath for 2 hours, and then, the produced solid was collected by suction filtration. The collected solid was washed with 1 L of cooled deionized water and dried at 60° C. overnight to obtain a white or off-white solid product (yield: 48 g, 39%). $^1$H-NMR data ($D_2O$/NaOH) of the obtained compound was as follows: 7.3 (2H, d), 6.76 (2H, d), and 3.2 (2H, t). $^{13}$C-NMR data ($D_2O$/NaOH) of the compound was as follows: 141, 130, 128, 112, and 73.

With regard to the above compound, a pigment was modified by the following general procedures. Black Pearls (registered trademark) 700 Carbon Black (manufactured by Cabot Corporation) was used as carbon black.

20 g of a pigment, 20 mmol of the material produced in the above, 20 mmol of nitric acid, and 200 mL of deionized water were blended by a Silverson Mixer (6000 rpm) at ambient temperature. After 30 minutes, sodium nitrite (20 mmol) dissolved in a small amount of water was slowly added to this mixture. The temperature reached 60° C. by mixing to allow the reaction to proceed for one hours. A surface-treated pigment was produced by the above process. Then, the pigment was adjusted to pH 8 to 9 with a NaOH solution. After 30 minutes, the dispersion solution in which the surface-treated pigment (including pigments obtained by binding at least two phosphonic acid groups or salt thereof are bound) was produced, was subjected to diafiltration using 20 parts by volume of deionized water by a spectrum membrane to be concentrated to 15 mass % of the solid content.

<b> Preparation of a Pigment Dispersion 2-2

A pigment dispersion 2-2 was obtained in the same manner as in the method described in the above pigment dispersion 2-1 except that the [2-(4-aminophenyl)-1-hydroxyethane-1, 1-diyl]-bisphosphonic acid-sodium salt was altered to a p-aminobenzoic acid-sodium salt.

<c> Pigment Dispersion 2-3

As a resin dispersion type pigment dispersion, a black pigment dispersion (trade name: Hostajet Black O-PT), manufactured by Clariant K.K. (Switzerland) was used.

TABLE 8

| | Pigment | Solid content (mass %) | Dispersing method | Functional group | pH | |
|---|---|---|---|---|---|---|
| Pigment dispersion 2-1 | Carbon black | 15 | Self-dispersion type | Phosphonic acid | 9.0 | * Trial product |
| Pigment dispersion 2-2 | Carbon black | 15 | Self-dispersion type | carboxylic acid | 8.0 | * Trial product |
| Pigment dispersion 2-3 | Carbon black | 15 | Resin dispersion type | Product on the market | 8.0 | * Trial product |

(3) Various Measuring Methods

<a> Surface Tension

A portable surface tensiometer (trade name: SITA science line t60-2, manufactured by EKO Instruments Co., Ltd.) was used to measure the surface tension at 25° C. by the maximum bubble pressure method. The surface tension at an bubble frequency of 5 Hz is shown in Tables 10 and 11.

<b> Viscosity

A viscoelasticity measuring instrument (Model: Physica MCR 301, manufactured by Anton Paar Co. Ltd.) was used to measure at 25° C. The resin emulsion was measured with a cone plate CP50-1, and the viscosity at a shear rate of 100 s$^{-1}$ is shown.

(4) Various Evaluation Methods

<a> Density of a Print Product and Image Reproducibility

A piezo drive system inkjet coater (Model: DMP-2831, manufactured by FUJIFILM Dimatrix, Inc.) was used to print at ambient temperature (25° C.) in the condition of a dot pitch (dot interval) of 20 μm, a discharge speed of 10 m/sec, and a drive frequency of 5 kHz. An image was printed on high-quality paper (trade name: OK Prince, manufactured by Oji Paper Co., Ltd.) to measure the solid density (OD) of the printed part of the print product by using a spectral colorimeter (trade name: X-Rite 938; manufactured by X-Rite Incorporated).

Similarly, a 7-point character was printed to evaluate image reproducibility according to the following standard.

[Evaluation Standard of Image Reproducibility]
⊚: Very clear image without bleeding
○: Clear image without bleeding
Δ: Inferior clearness with slight bleeding
x: Unclear image with bleeding <b> Drying Characteristics Drying characteristics were evaluated by finger touching after the print product was allowed to stand at ambient temperature for 5 minutes after printing on coated paper (trade name: OK Topcoat+, manufactured by Oji Paper Co., Ltd.).

[Evaluation Standard]
⊚: Ink was not stuck to a finger at all.
○: Ink was not almost stuck to a finger.
x: Ink was stuck to a finger.

<c> Abrasion Resistance of an Image

An image was printed on coated paper (trade name: OK Topcoat+, manufactured by Oji Paper Co., Ltd.) and dried, and then, rubbed with a copy paper (regenerated paper: FS-PAPER) under a load of 500 g to evaluate according to the following standard.

[Evaluation Standard]

⊚: Ink is not stuck to the copy paper and no change in the image was observed.

○: Ink is stuck a little to the copy paper and reduction in the density of the image was observed.

x: Ink was stuck to the copy paper and reduction in the density of the image was significant.

<d> Water Resistance of an Image

Each of the obtained image samples was dipped at 25° C. in water for 2 hours to evaluate the condition of elution of ink from the printed portion according to the following standard.

[Evaluation Standard]

⊚: Neither reduction in density nor bleeding caused by elution of ink was not observed.

○: Reduction in density or bleeding caused by elution of ink was slightly observed.

x: Reduction in density or bleeding caused by elution of ink was significant.

Example 2-1

As an ink composition, the resin emulsion 2-1 shown in Table 7, the pigment dispersion 2-1 shown in Table 8, glycerin and diethylene glycol as water-soluble organic solvents, a surfactant (trade name: Surfynol 465, manufactured by Air Products Inc.) to adjust surface tension, and water were used to prepare ink of ink composition 2-1 shown in Table 9. The surface tension and viscosity of the ink were measured. The inkjet coater was used to print on a paper base material and then, the density of the print product, image reproducibility, drying characteristics, abrasion resistance of an image, and water resistance of an image were evaluated. The results are collectively shown in Table 10.

Figure 2A:
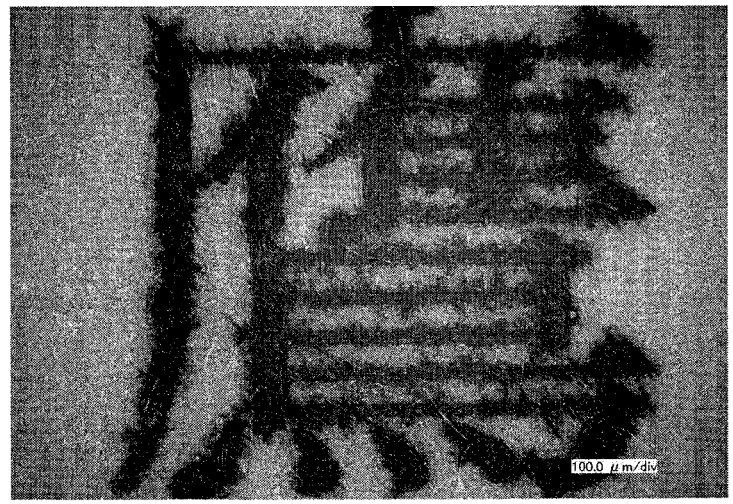
FIG. 2 is a photograph for explaining the evaluation of the reproducibility of an image in an example.

FIG. 2A shows a photograph of a character (character size: 7-point) printed to explain the evaluation of the image reproducibility in Example 2-1. In FIG. 2A, bleeding of a character is limited to obtain a clear image.

Examples 2-2 to 2-6

Ink of an ink composition 2-1 shown in Table 9 was prepared in the same manner as in Example 2-1 except that the pigment dispersion and the resin emulsion were altered to those shown in Tables 10 and 11. The surface tension and viscosity of the ink were measured in the same manner as those described in Example 2-1. The inkjet coater was used to print on a paper base material and then, the density of the print product, image reproducibility, drying characteristics, abrasion resistance of an image, and water resistance of an image were evaluated. The results are collectively shown in Tables 10 and 11.

Example 2-7

Ink of an ink composition 2-2 shown in Table 9 was prepared using the pigment dispersion and the resin emulsion shown in Table 11. The surface tension and viscosity of the ink were measured in the same manner as those described in Example 2-1. The inkjet coater was used to print on a paper base material and then, the density of the print product, image reproducibility, drying characteristics, abrasion resistance of an image, and water resistance of an image were evaluated. The results are collectively shown in Table 11.

TABLE 9

|  | Ink composition 2-1 (mass %) | Ink composition 2-2 (mass %) |
| --- | --- | --- |
| Pigment dispersion | 33.3 | 33.3 |
| (as the pigment component in the pigment dispersion) | (5) | (5) |
| Resin emulsion | 16.7 | 16.7 |
| (as the resin in the resin emulsion) | (5) | (5) |
| Glycerin | 20 | 20 |
| Diethylene glycol | 20 | 17 |
| 3-methoxy-3-methyl-1-butanol | — | 3 |
| Surfactant | 0.5 | 0.5 |
| Water | balance | balance |

Comparative Examples 1 to 3

Ink of an ink composition 2-1 was prepared in the same manner as in Example 2-1 except that the pigment dispersion, the resin emulsion and composition of the ink were altered to those shown in Table 11. The surface tension and viscosity of the ink were measured in the same manner as those described in Example 2-1. The inkjet coater was used to print on a paper base material and then, the density of the print product, image reproducibility, drying characteristics, abrasion resistance of an image, and water resistance of an image were evaluated. The results are collectively shown in Table 11.

Figure 2B:
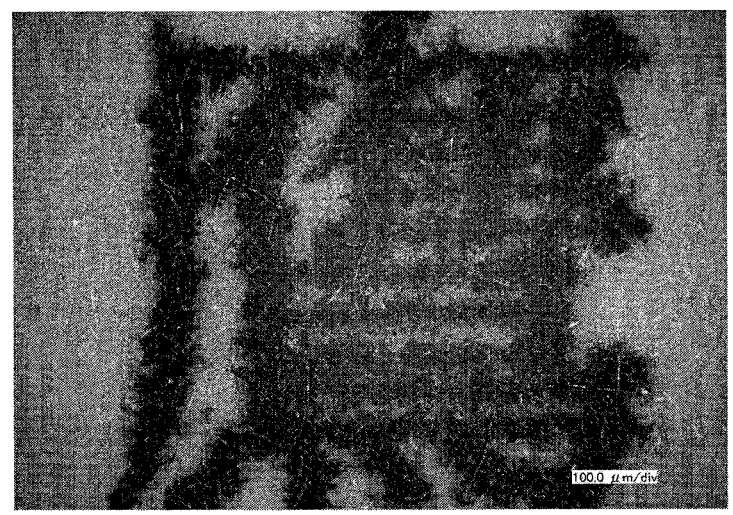

FIG. 2B shows a photograph of a character (character size: 7-point) printed to explain the evaluation of the image reproducibility in Comparative Example 3. In FIG. 2B, much bleeding of a character is observed and the clearness of an image is inferior to that of FIG. 2A.

TABLE 10

|  |  |  | Example 2-1 | Example 2-2 | Example 2-3 | Example 2-4 | Example 2-5 |
| --- | --- | --- | --- | --- | --- | --- | --- |
| Component | Pigment dispersion | — | Dispersion 2-1 | Dispersion 2-1 | Dispersion 2-2 | Dispersion 2-2 | Dispersion 2-3 |
|  | Resin emulsion | — | Resin emulsion 2-1 | Resin emulsion 2-2 | Resin emulsion 2-1 | Resin emulsion 2-2 | Resin emulsion 2-1 |
|  | Compounding ratio | — | Ink composition 2-1 | Ink composition 2-1 | Ink composition 2-1 | Ink composition 2-1 | Ink composition 2-1 |
| Results of evaluation | Surface tension | [mN/m] | 42.0 | 41.1 | 42.7 | 41.3 | 44.7 |
|  | Viscosity | [mPa · s] | 7.08 | 6.42 | 6.56 | 6.42 | 9.83 |
|  | Image reproducibility | — | ⊙ | ⊙ | ○ | ○ | ○ |
|  | Density of print product | — | 1.19 | 1.18 | 1.07 | 1.08 | 1.03 |

TABLE 10-continued

|  |  | | Example 2-1 | Example 2-2 | Example 2-3 | Example 2-4 | Example 2-5 |
|---|---|---|---|---|---|---|---|
|  | Drying characteristics | — | ○ | ○ | ○ | ○ | ○ |
|  | Abrasion resistance | — | ⊙ | ○ | ⊙ | ○ | ⊙ |
|  | Water resistance | — | ⊙ | ○ | ⊙ | ○ | ⊙ |

TABLE 11

|  |  | | Example 2-6 | Example 2-7 | Comparative Example 1 | Comparative Example 2 | Comparative Example 3 |
|---|---|---|---|---|---|---|---|
| Component | Pigment dispersion | — | Dispersion 2-3 | Dispersion 2-1 | Dispersion 2-1 | Dispersion 2-1 | Dispersion 2-3 |
|  | Resin emulsion | — | Resin emulsion 2-2 | Resin emulsion 2-1 | Resin emulsion 2-3 | Resin emulsion 2-3 | Resin emulsion 2-3 |
|  | Compounding ratio | — | Ink composition 2-1 | Ink composition 2-2 | Ink composition 2-1 | Ink composition 2-1 | Ink composition 2-1 |
| Results of evaluation | Surface tension | [mN/m] | 44.3 | 39.7 | 41.4 | 41.8 | 47.1 |
|  | Viscosity | [mPa·s] | 9.37 | 6.69 | 6.54 | 6.48 | 9.38 |
|  | Image reproducibility | — | ○ | ⊙ | Δ | X | X |
|  | Density of print product | — | 1.04 | 1.20 | 1.18 | 1.07 | 1.06 |
|  | Drying characteristics | — | ○ | ⊙ | ○ | ○ | ○ |
|  | Abrasion resistance | — | ○ | ⊙ | X | ○ | ○ |
|  | Water resistance | — | ○ | ⊙ | X | X | X |

The invention claimed is:

1. An ink composition comprising a pigment dispersion containing a surface-treated pigment, a resin emulsion, and water wherein:
the surface-treated pigment is obtained by binding a functional group, having a larger calcium index than a calcium index of 1,2,3-benzenetricarboxylic acid, to the surface of a pigment; and
the resin emulsion is adapted so that an aqueous solution containing 1 mass % of a solid content of the resin emulsion has a conductance of 300 μS/cm or less.

2. An ink composition comprising a pigment dispersion containing a surface-treated pigment, a resin emulsion, and water, wherein:
the surface-treated pigment is obtained by binding a functional group, having a larger calcium index than a calcium index of 1,2,3-benzenetricarboxylic acid, to the surface of a pigment; and
the pigment dispersion and the resin emulsion satisfy the following equation (1) when a conductance of an aqueous solution containing 1 mass % pigment of the pigment dispersion is referred to as A (μS/cm) and a conductance of an aqueous solution containing 1 mass % of a solid content of the resin emulsion is referred to as B (μS/cm):

$$A \times B < 4.0 \times 10^4 \quad (1).$$

3. The ink composition according to claim 1, wherein a content of the pigment of the pigment dispersion is in a range of 0.5 mass % to 20 mass % of a total amount of the ink composition, the solid content of the resin emulsion is in a range of 0.5 mass % to 20 mass % of the total amount of the ink composition, and a sum of a solid content of the pigment of the pigment dispersion and a solid content of the resin emulsion is in a range of 1.0 mass % to 20 mass % of the total amount of the ink composition.

4. The ink composition according to claim 1, further comprising a water-soluble organic solvent.

5. The ink composition according to claim 4, wherein the water-soluble organic solvent is contained in a range of 10 mass % to 70 mass % of the total amount of the ink composition.

6. An ink composition comprising at least a pigment, a resin emulsion, and an aqueous solvent containing a surfactant and water, wherein one or two or more phosphorous-containing functional groups, containing at least one P—O or P═O bond, are bounded to a resin forming the resin emulsion, and an aqueous solution containing 1 mass % of a solid content of the resin emulsion has a conductance of 300 μS/cm or less.

7. The ink composition according to claim 6, wherein the phosphorous-containing functional group is one or two or more types selected from a phosphonic acid group, a phosphinic acid group, a phosphinous acid group, a phosphite group, a phosphate group, a diphosphate group, a triphosphate group, and a pyrophosphate group, and partially esters and salts of these groups.

8. The ink composition according to claim 6, wherein the average particle diameter of the resin emulsion is 500 nm or less.

9. The ink composition according to claim 6, wherein the pigment is obtained by binding a functional group, having a larger calcium index than a calcium index of 1,2,3-benzenetricarboxylic acid, to the surface thereof.

10. The ink composition according to claim 6, wherein resin emulsion is contained in the ink composition in a range of 0.05 mass % to 20 mass % as a solid content in the ink composition.

11. The ink composition according to claim 6, wherein the pigment is contained in a range of 0.05 mass % to 20 mass %, the resin emulsion is contained in a range of 0.05 mass % to 20 mass % as a solid content, and also a sum of the solid contents of the pigment and the resin emulsion is in a range of 0.1 mass % to 30 mass %.

12. The ink composition according to claim 6, wherein 3-methoxy-3-methyl-1-butanol is contained in a range of 0.5 mass % to 25 mass % in the ink composition.

13. The ink composition according to claim 1, comprising at least glycerin or diethylene glycol.

14. The ink composition according to claim 1, wherein a viscosity of the ink composition is in a range of 1.5 mPa·s to 15 mPa·s at 25° C.

15. The ink composition according to claim 1, wherein a surface tension of the ink composition is in a range of 20 mN/m to 45 mN/m.

16. The ink composition according to claim 1, wherein pH of the ink composition is in a range of 7 to 11.

* * * * *

UNITED STATES PATENT AND TRADEMARK OFFICE
CERTIFICATE OF CORRECTION

| | | Page 1 of 1 |
|---|---|---|
| PATENT NO. | : 8,841,356 B2 | |
| APPLICATION NO. | : 13/499106 | |
| DATED | : September 23, 2014 | |
| INVENTOR(S) | : Satoshi Shioda et al. | |

It is certified that error appears in the above-identified patent and that said Letters Patent is hereby corrected as shown below:

On the Title Page, item (75)

Delete "Yukio Sugita, Tokyo-to (JP); Fumie Yamazaki, Tokyo-to (JP); Naoki Shiraishi, Tokyo-to (JP); Mitsuyoshi Tamura, Tokyo-to (JP)"
and insert --Yukio Sugita, Kanagawa (JP); Fumie Yamazaki, Kanagawa (JP); Naoki Shiraishi, Kanagawa (JP); Mitsuyoshi Tamura, Kanagawa (JP)--.

Signed and Sealed this
Seventh Day of April, 2015

Michelle K. Lee
*Director of the United States Patent and Trademark Office*